(12) United States Patent
Liang et al.

(10) Patent No.: US 12,019,718 B2
(45) Date of Patent: Jun. 25, 2024

(54) IDENTITY VERIFICATION METHOD AND APPARATUS, COMPUTER DEVICE AND STORAGE MEDIUM

(71) Applicant: Tencent Technology (Shenzhen) Company Limited, Guangdong (CN)

(72) Inventors: Jian Liang, Guangdong (CN); Yuren Cao, Shenzhen (CN); Chenbin Zhang, Shenzhen (CN); Kun Bai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 404 days.

(21) Appl. No.: 17/359,125

(22) Filed: Jun. 25, 2021

(65) Prior Publication Data

US 2021/0326576 A1  Oct. 21, 2021

Related U.S. Application Data

(63) Continuation of application No. PCT/CN2020/078777, filed on Mar. 11, 2020.

(30) Foreign Application Priority Data

Apr. 24, 2019  (CN) .......................... 201910336037.4

(51) Int. Cl.
*G06F 21/31* (2013.01)
*G06F 18/214* (2023.01)
(Continued)

(52) U.S. Cl.
CPC ............ *G06F 21/31* (2013.01); *G06F 18/214* (2023.01); *G06F 21/32* (2013.01); *G06N 3/004* (2013.01);
(Continued)

(58) Field of Classification Search
CPC ........ G06F 21/31; G06F 18/214; G06F 21/32; G06N 3/004; G06N 3/08; G06N 3/045;
(Continued)

(56) References Cited

U.S. PATENT DOCUMENTS 10,796,205 B2   10/2020  Shi et al.
2018/0314716 A1*  11/2018  Kim .......................... G06T 1/20
(Continued)

FOREIGN PATENT DOCUMENTS

CN  106022317 A  * 10/2016  ......... G06K 9/00268
CN  108090465 A     5/2018
(Continued)

OTHER PUBLICATIONS

Notification of Reasons for Refusal for JP 2021-539985 dated Aug. 31, 2022, 3p, in Japanese language.
(Continued)

*Primary Examiner* — Amandeep Saini
*Assistant Examiner* — Daniella M. DiGuglielmo
(74) *Attorney, Agent, or Firm* — Crowell & Moring LLP

(57) ABSTRACT

An identity authentication method is provided, including: acquiring a raw feature of a user; calling an identity authentication model to extract a primary attribute feature vector in the raw feature, the primary attribute feature vector being an unbiased feature representation for selectively decoupling m−1 domain discrepancy features in the raw feature, and m being an integer greater than 2; and performing unbiased identity authentication based on the primary attribute feature vector to obtain an identity authentication result.

20 Claims, 11 Drawing Sheets

(51) Int. Cl.
  *G06F 21/32* (2013.01)
  *G06N 3/004* (2023.01)
  *G06N 3/045* (2023.01)
  *G06N 3/047* (2023.01)
  *G06N 3/048* (2023.01)
  *G06N 3/08* (2023.01)
  *G06N 3/084* (2023.01)
  *G06V 10/764* (2022.01)
  *G06V 10/774* (2022.01)
  *G06V 10/82* (2022.01)
  *G06V 40/12* (2022.01)
  *G06V 40/16* (2022.01)
  *G06V 40/18* (2022.01)

(52) U.S. Cl.
  CPC ............... *G06N 3/045* (2023.01); *G06N 3/08* (2013.01); *G06N 3/084* (2013.01); *G06V 10/764* (2022.01); *G06V 10/774* (2022.01); *G06V 10/82* (2022.01); *G06V 40/168* (2022.01); *G06V 40/172* (2022.01); *G06N 3/047* (2023.01); *G06N 3/048* (2023.01); *G06V 40/1365* (2022.01); *G06V 40/197* (2022.01)

(58) Field of Classification Search
  CPC ........ G06N 3/048; G06N 3/047; G06N 3/084; G06V 10/764; G06V 10/774; G06V 10/82; G06V 40/168; G06V 40/172; G06V 40/1365; G06V 40/197
  See application file for complete search history.

(56) References Cited

U.S. PATENT DOCUMENTS

| | | | |
|---|---|---|---|
| 2018/0336438 A1 | 11/2018 | Ziqiang et al. | |
| 2019/0102528 A1* | 4/2019 | Beacham | G06V 10/82 |
| 2019/0266442 A1* | 8/2019 | Malur Srinivasan | G06V 10/82 |
| 2019/0295302 A1* | 9/2019 | Fu | G06V 10/82 |
| 2020/0184053 A1* | 6/2020 | Kursun | G06V 10/764 |
| 2021/0326576 A1 | 10/2021 | Liang et al. | |

FOREIGN PATENT DOCUMENTS

| | | | |
|---|---|---|---|
| CN | 108229348 A | | 6/2018 |
| CN | 108766444 A | | 11/2018 |
| CN | 109376769 A | | 2/2019 |
| CN | 110059465 A | | 7/2019 |
| EP | 3 961 441 A1 | | 3/2022 |
| JP | 2018-194828 A | | 12/2018 |
| JP | 2022-529863 A | | 6/2022 |
| WO | WO 2019/196303 A1 | | 10/2019 |
| WO | WO 2020/215915 A1 | | 10/2020 |

OTHER PUBLICATIONS

English language translation of Notification of Reasons for Refusal for JP 2021-539985 dated Aug. 31, 2022, 6p.
Office Action issued for corresponding Chinese application No. 201910336037.4 dated May 5, 2023, 7p, in Chinese language.
Tang, Xu, "Identity-preserved generative adversarial networks for face aging", Electronic Design Engineering, vol. 26, No. 7, Apr. 2018, pp. 175-184.
Zhao, An-Cai et al., "Design and hardware implementation of real-time edge detection system based on improved Canny algorithm", Electronic Design Engineering, vol. 26, No. 7, Apr. 2018, pp. 189-193.
Concise Explanation of Relevancy for D5.
International Search Report and Written Opinion for priority application No. PCT/CN2020/078777, dated Jun. 16, 2020, 10p, in Chinese language.
English language translation of the International Search Report for priority application No. PCT/CN2020/078777, dated Jun. 16, 2020, 2p.
Concise Explanation of Relevance of Written Opinion for priority application No. PCT/CN2020/078777, 1p.
Communication re Supplementary European Search Report for application No. EP20794930.6 dated Jun. 22, 2022, 1p.
Extended European Search Report for application No. EP20794930.6 dated Jun. 3, 2022, 9p.
Goodfellow, Ian J. et al, "Explaining and Harnessing Adversarial Examples", published as a conference paper at ICLR 2015, Mar. 20, 2015, found on the internet @ https://arxiv.org/pdf/1412.6572.pdf, 11p.
Ding, Zhengming et al., One-Shot Face Recognition via Generative Learning:, 13th IEEE International Conference on Automatic Face & Gesture Recognition, IEEE, May 15, 2018, 7p, DOI: 10.1109/FG. 2018.00011.

* cited by examiner

IDENTITY VERIFICATION METHOD AND APPARATUS, COMPUTER DEVICE AND STORAGE MEDIUM

RELATED APPLICATION

This application is a continuation of PCT Patent Application No. PCT/CN2020/078777, entitled "IDENTITY VERIFICATION METHOD AND APPARATUS, COMPUTER DEVICE AND STORAGE MEDIUM" and filed to the China Patent Office on Mar. 11, 2020, which claims priority to Chinese Patent Application No. 201910336037.4 filed to the China Patent Office on Apr. 24, 2019 and entitled of "IDENTITY AUTHENTICATION METHOD, AND TRAINING METHOD, APPARATUS AND DEVICE FOR GENERATIVE ADVERSARIAL NETWORK." The above applications are incorporated herein by reference in their entireties.

TECHNICAL FIELD

This application relates to the field of artificial intelligence, and in particular, to an identity authentication method and apparatus, a computer device and a storage medium.

BACKGROUND

Identity authentication technology refers to a technology of authenticating a user's identity through certain means in a computer system. Common identity authentication technologies include face recognition, fingerprint recognition, terminal posture recognition, and so on.

Taking face recognition as an example, a neural network model is disposed in a server. When a face image of a user-to-be-authenticated is acquired, the neural network model is called to authenticate the face image. If the authentication is successful, the identity of the user-to-be-authenticated is determined. If the authentication fails, an error notification is fed back. The neural network model is trained in advance using a training set.

However, the neural network model above may mistakenly learn biased predictions. For example, when the user starts to grow a beard, wear glasses, or change clothes due to the seasons, the authentication of the neural network model may fail.

SUMMARY

According to various embodiments provided in this disclosure, provided are an identity authentication method and apparatus, a computer device and a storage medium. The technical solutions are as follows:

According to an aspect of this disclosure, provided is an identity authentication method, executed by a computer device, the method including:
acquiring a raw feature of a user, the raw feature containing m−1 domain discrepancy features, and m being an integer greater than 2;
extracting a primary attribute feature vector in the raw feature, the primary attribute feature vector being an unbiased feature representation by selectively decoupling the m−1 domain discrepancy features in the raw feature, m being an integer greater than 2; and
performing unbiased identity authentication based on the primary attribute feature vector to obtain an identity authentication result.

In an embodiment, an identity authentication model is called to perform feature extraction on the raw feature, to obtain a primary attribute feature vector in the raw feature; and the identity authentication model includes:
a first generative adversarial network, or the first generative adversarial network and a second generative adversarial network, where
the first generative adversarial network is a network trained by selectively decoupling the m−1 domain discrepancy features based on a causal relationship, and the second generative adversarial network is a network trained by performing additive adversarial training on a random combination of attribute feature vectors of different attributes extracted by the first generative adversarial network, the attributes including an identity and m−1 domain discrepancies.

According to an aspect of this disclosure, provided is a method for training a first generative adversarial network. The first generative adversarial network includes m generators $G_1$ to $G_m$; each of the generators $G_j$ corresponds to m discriminators $G_{j1}$ to $G_{jm}$; and a $j^{th}$ generator $G_j$ is configured to learn a feature of a $j^{th}$ attribute, the attributes including an identity and m−1 domain discrepancies, i, j, j'∈[m]. The method includes:
fixing all generators $G_i$, and optimizing all discriminators $D_{ij}$ to make an output approximate to a tag $y_i$ corresponding to a $j^{th}$ attribute;
fixing all discriminators $D_{ij}$, and optimizing all generators $G_i$ to make an output approximate to a tag $(1-y_i)$ corresponding to the $j^{th}$ attribute; where
in response to a causal relationship between an $a^{th}$ attribute and a $b^{th}$ attribute, back-propagation of an output loss of the discriminator $D_{ab}$ is skipped.

According to an aspect of this disclosure, provided is a method for training a second generative adversarial network. The second generative adversarial network includes m additive spatial transformer networks and m recognition networks having one-to-one correspondence to m attributes, the attributes including an identity and m−1 domain discrepancies, j∈[m], m being an integer greater than 2. The method includes:
randomly combining attribute feature vectors corresponding to different attributes extracted from a training set to generate $n_r$ combined attribute feature vectors;
dividing the $n_r$ combined attribute feature vectors into a first vector set and a second vector set, an attribute combination of the combined attribute feature vectors in the first vector set being an attribute combination appearing in the training set, and an attribute combination of the combined attribute feature vectors in the second vector set being an attribute combination that does not appear in the training set;
using the first vector set and the second vector set to predict the additive spatial transformer networks and the recognition networks, a $j^{th}$ additive spatial transformer network being configured to convert a $j^{th}$ combined attribute feature vector into a $j^{th}$ additive feature vector, and a $j^{th}$ recognition network being configured to perform tag recognition corresponding to the $j^{th}$ attribute on a sum feature vector of m additive feature vectors;
for a first loss of the first vector set generated in the prediction process, back-propagating the first loss to the recognition network and the additive spatial transformer network corresponding to each attribute; and
for a second loss of the second vector set generated in the prediction process, back-propagating the second loss to the recognition networks and the additive spatial transformer networks corresponding to other attributes.

According to another aspect of this disclosure, provided is an identity authentication apparatus, including:

an acquisition module, configured to acquire a raw feature of a user, m being an integer greater than 2; and an identity authentication module, configured to extract a primary attribute feature vector in the raw feature, the primary attribute feature vector being an unbiased feature representation for selectively decoupling the m−1 domain discrepancy features in the raw feature, m being an integer greater than 2; and the identity authentication module being further configured to perform unbiased identity authentication based on the primary attribute feature vector to obtain an identity authentication result.

According to an aspect of this disclosure, provided is an identity authentication apparatus, comprising:

a sensor, configured to acquire a raw feature of a user, the raw feature containing m−1 domain discrepancy features, and m being an integer greater than 2; and at least one processor in communication with the sensor, configured to:

extract a primary attribute feature vector in the raw feature, the primary attribute feature vector being an unbiased feature representation for selectively decoupling the m−1 domain discrepancy features in the raw feature, m being an integer greater than 2; and perform unbiased identity authentication based on the primary attribute feature vector to obtain an identity authentication result.

According to another aspect of this disclosure, provided is a computer device, including a processor and a memory, the memory storing computer-readable instructions, the computer-readable instructions, when executed by the processor, causing the processor to perform steps of the identity authentication method.

According to another aspect of this disclosure, provided is a non-transitory computer-readable storage medium storing computer-readable instructions, the computer-readable instructions, when executed by one or more processors, causing the one or more processors to perform steps of the identity authentication method.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure more clearly, the accompanying drawings required for describing the embodiments are briefly described hereinafter. Apparently, the accompanying drawings in the following description show merely some embodiments of this disclosure, and a person of ordinary skill in the art may obtain other accompanying drawings from these accompanying drawings without creative efforts.

DESCRIPTION OF EMBODIMENTS

Figure 1:
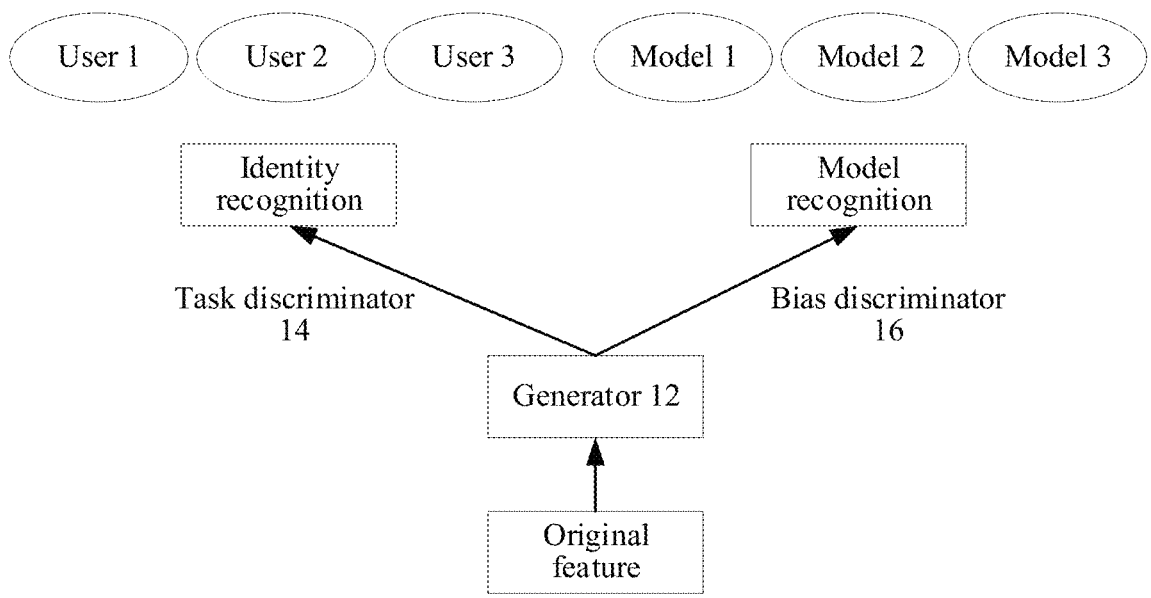
FIG. 1 is a flowchart of an identity authentication method provided in the related technology.

To make the objectives, technical solutions, and advantages of this disclosure clearer, the following further describes implementations of this disclosure in detail with reference to the accompanying drawings.

First, the following explains several terms involved in the embodiments of this disclosure.

Identity authentication technology: A technology of authenticating a user's identity through computer means. Common identity authentication technologies include at least one of face recognition, fingerprint recognition, voiceprint recognition, iris recognition, terminal posture recognition, and pedestrian re-recognition.

Identity authentication model: A neural network model for identity recognition.

Face recognition: A technology of authenticating the user's identity through feature points on a face image. The feature points on the face image include, but are not limited to: at least one of an eyebrow feature point, an eye feature point, a mouth feature point, a nose feature point, an ear feature point, and a cheek feature point.

Terminal posture recognition: A technology of authenticating the user's identity based on operation features of the user's operation in a physical dimension, such as pressing force, pressing frequency, pressing position, body vibration frequency, body vibration period, and body displacement, acquired by a sensor in a terminal when the user uses the terminal (such as a mobile phone).

Domain: A factor that causes an overall distribution deviation of a subset of samples in a training set. For example, for face recognition, the hair colors of different users, black, yellow and white, can be regarded as a difference of the domain; whether different users wear glasses can also be regarded as a difference of the domain. Whether different users have a beard can also be regarded as a difference of the domain.

Transfer learning: In response to domain discrepancies in data, a learning system is constructed to deal with the domain discrepancies.

Negative transfer: In transfer learning, the phenomenon that the accuracy of a test set decreases due to a certain transfer learning method adopted on the training set.

Generative Adversarial Network (GAN): A generative model that has been widely studied in recent years and has the ability to capture real data distribution.

Generator: A part of GAN that is responsible for generating sufficiently realistic data.

Discriminator: A part of GAN that plays with the generator, and it is responsible for determining whether the data generated by the generator is close to the real data.

In the process of using an identity authentication model for identity authentication, the identity authentication model may mistakenly learn a biased prediction due to user grouping/clustering. For example, in face recognition authentication, when the user starts to grow a beard or wear glasses, the authentication may fail. In addition, in the field of pedestrian re-recognitions, authentication may also fail when people change clothes due to the seasons or images are collected with cameras at different angles.

In related technologies, provided is a method for eliminating the influence of domain discrepancies on the accuracy of identity authentication. Such methods include, but are not limited to: Transfer Component Analysis (TCA), Deep Adaptation Network (DAN), Reversing Gradient (RevGrad), and Adversarial Discriminative Domain Adaptation (ADDA).

Such methods eliminate the domain discrepancy of learned features while learning the main classification task (such as identity authentication). Assume that there are domain discrepancies between different mobile phone models in identity authentication, as shown in FIG. 1, the identity authentication model includes: a generator 12, a task discriminator 14, and a bias discriminator 16. The generator 12 is configured to extract a feature vector from an raw feature; the task discriminator 14 is configured to perform identity recognition based on the feature vector, such as user 1, user 2, and user 3; and the bias discriminator 16 is configured to perform model discrimination based on the feature vector, such as model 1, model 2, and model 3. That is, the raw feature is learned through a generator network 12, and identity recognition and model discrimination are synchronously performed on the outputted feature vector. The bias discriminator 16 eliminates feature information related to model discrimination in the feature vector outputted by the generator 12 through adversarial learning, and the task discriminator 14 is configured to perform identity recognition on the user.

Since there are a plurality of domain discrepancies that affect the identity authentication model, such as hair color, hairstyle, glasses, beard, and earrings, in response to a plurality of domain discrepancies and dependencies between the domain discrepancies, two problems may arise in the above technical solution: (1) it is possible to force decoupling of domain discrepancies with dependencies to cause negative transfer; and (2) it is possible that, due to insufficient decoupling of domain discrepancies of irrelevant attributes, there are still too many attribute dependencies in the learned features.

The certain embodiments of this disclosure provide an unbiased identity authentication solution, which can eliminate the influence of a plurality of domain discrepancies on identity authentication as much as possible, and is suitable for identity authentication scenarios with a plurality of domain discrepancies.

Figure 2:
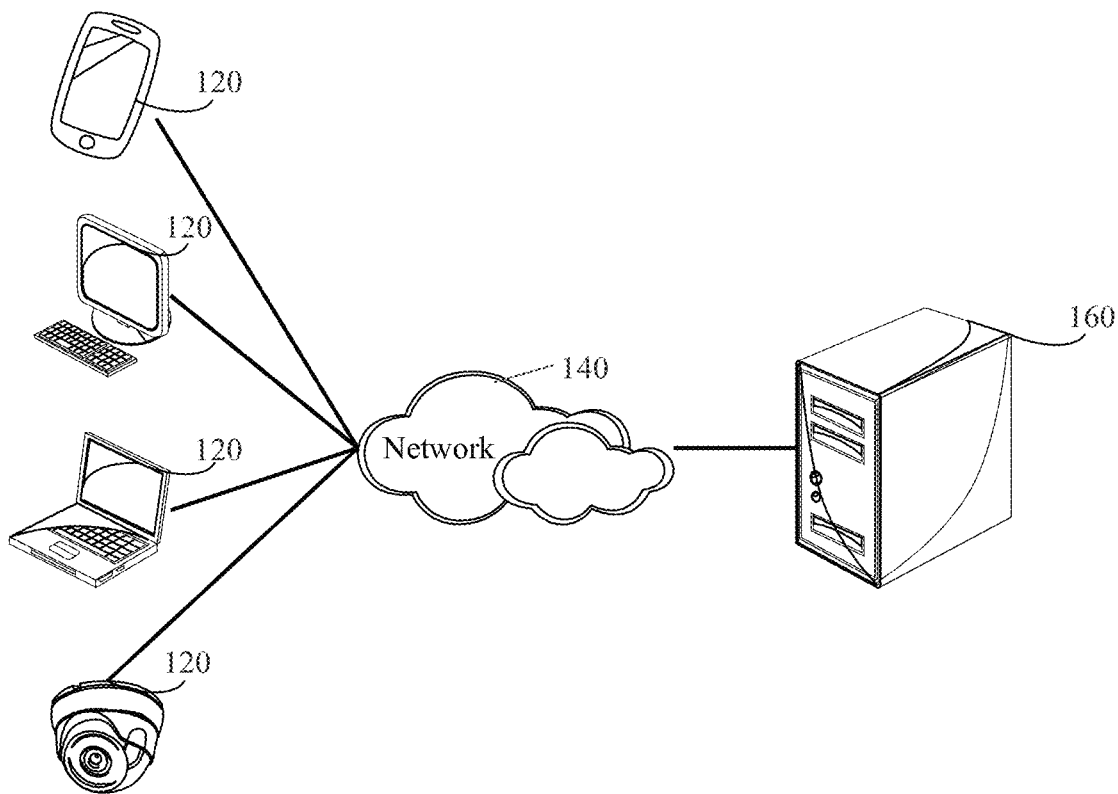
FIG. 2 is a block diagram of an identity authentication system provided by an exemplary embodiment of this disclosure.

FIG. 2 is a block diagram of an identity authentication system provided by an exemplary embodiment of this disclosure. The identity authentication system includes a terminal 120, a network 140, and a server 160.

The terminal 120 may be a mobile phone, a tablet computer, a desktop computer, a notebook computer, a surveillance camera, and other devices. The terminal 120 is a terminal with identity authentication requirements. The terminal 120 is configured to acquire a raw feature required for identity authentication. The raw feature includes at least one of face data, terminal sensor data, iris data, fingerprint data, and voiceprint data. In some embodiments, a user account may be logged on the terminal 120, that is, the terminal 120 may be a private device. In other embodiments, the terminal 120 is a monitoring device with monitoring properties.

The terminal 120 can be connected to the server 160 through the network 140. The network 140 may be a wired network or a wireless network. The terminal 120 can transmit the authentication data to the server 160, and upon completion of the identity authentication, the server 160 returns an identity authentication result to the terminal 120.

The server 160 is a back-end server for identity authentication. The server 160 is provided with a neural network model for identity authentication (hereinafter referred to as an identity authentication model). The identity authentication model can perform identity authentication based on feature data of unbiased representation.

Figure 3:
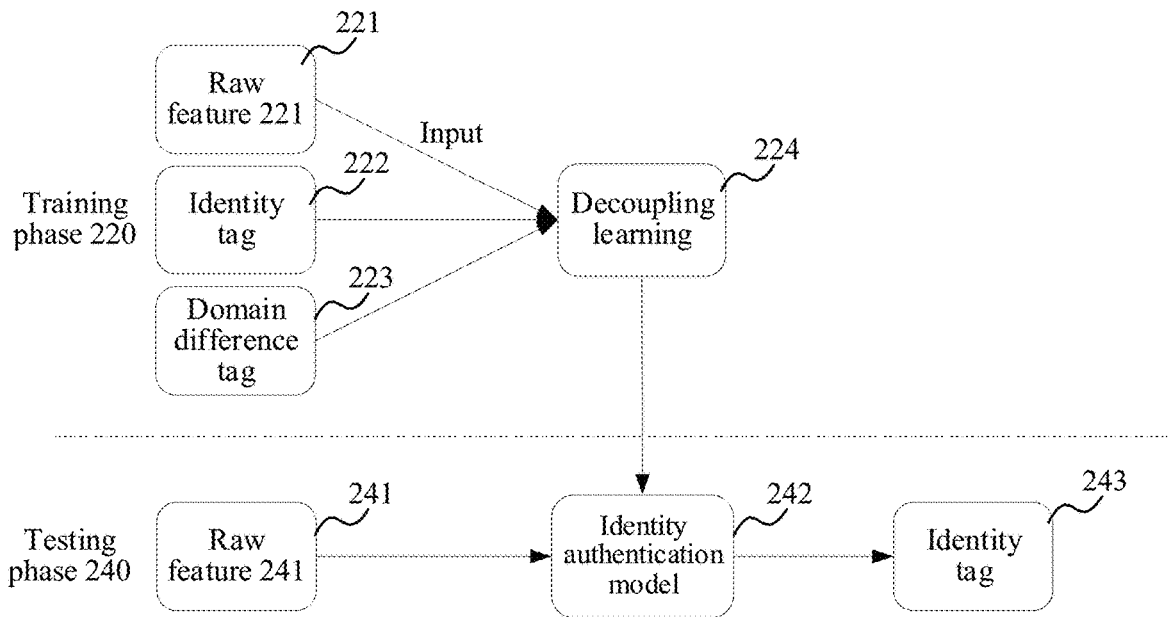
FIG. 3 is a flowchart of an identity authentication method provided by an exemplary embodiment of this disclosure.

FIG. 3 is a flowchart of an identity authentication method provided by an exemplary embodiment of this disclosure. The identity authentication method includes: a training phase 220 and a testing (and application) phase 240.

In the training phase 220, a training set for training the identity authentication model is constructed. The training set includes: a raw feature 221, an identity tag 222, and a plurality of domain discrepancy tags 223 of each sample. Exemplarily, each sample corresponds to a user, and the raw feature 221 is user feature data acquired in the identity authentication process. The identity tag 222 is configured to identify the identity of the user, and the domain discrepancy tag 223 is configured to identify the domain discrepancy of the user. Taking the domain discrepancy including a hair color difference and a beard difference as an example, Table I schematically shows two groups of samples.

TABLE I

| | | Raw feature | |
| --- | --- | --- | --- |
| | Identity tag | Domain difference tag 1 | Domain difference tag 2 |
| Face image 1 | Black fairy | White hair | bearded |
| Face image 2 | Bruce Lee | Black hair | No beard |

Decoupling learning 224 is performed on the identity authentication model using this training set. The decoupled learning 224 takes identity authentication as a primary learning task, and a plurality of domain discrepancies as secondary learning tasks. For each sample, the identity and each domain discrepancy are regarded as an attribute. For each attribute, the method of adversarial learning is used for learning a decoupling representation of each attribute (that is, a feature vector of each attribute is extracted independently as much as possible), so that a hidden layer space does not contain classification information of other attributes. As a result, a finally learned identity authentication model 242 can ignore the influence of a plurality of domain discrepancies on identity authentication as much as possible, thereby outputting an accurate identity authentication result.

In the testing (and application) phase 240, a raw feature 241 in a testing set is inputted to an identity authentication model 242 for unbiased identity authentication, and then an identity authentication result (that is, an identity tag 243) is outputted. In response to test pass, the identity authentication model 242 is put into practical application.

Figure 4:
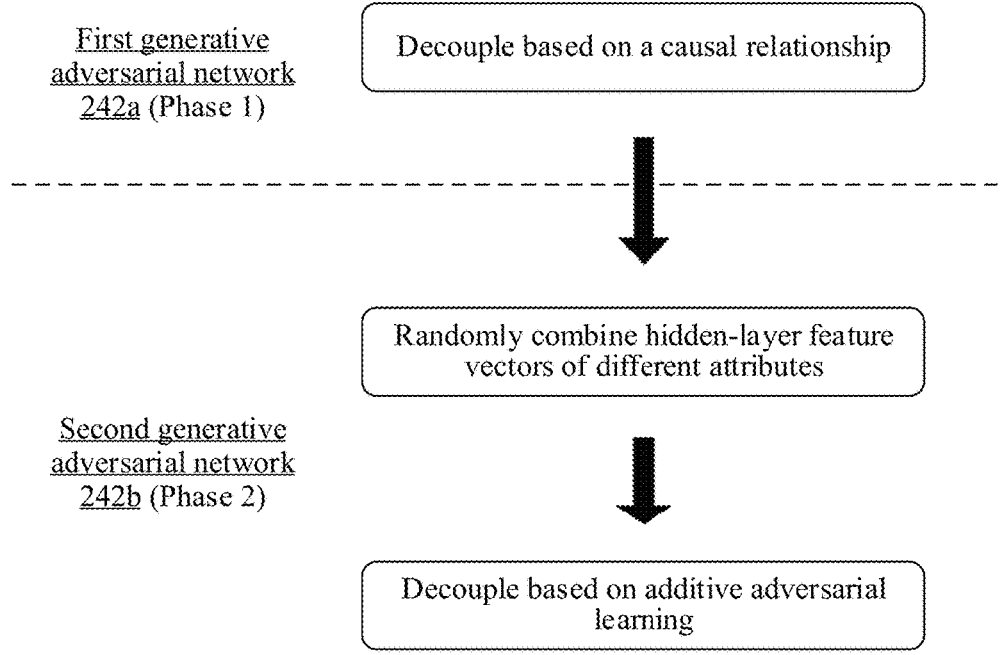
FIG. 4 is a two-phase schematic diagram of a first generative adversarial network and a second generative adversarial network during operation provided by an exemplary embodiment of this disclosure.

FIG. 4 is a structural block diagram of an identity authentication model 242 provided by an exemplary embodiment of this disclosure. The identity authentication model 242 includes a first generative adversarial network 242a and a second generative adversarial network 242b.

The first generative adversarial network 242a is a network trained by selectively decoupling m−1 domain discrepancy features based on a causal relationship, m being an integer greater than 2. The second generative adversarial network 242b is a network trained by performing additive adversarial training on a random combination of different attribute feature vectors outputted by the first generative adversarial network 242a.

The first generative adversarial network 242a and the second generative adversarial network 242b are configured to implement two-phase decoupling learning.

In phase 1, the first generative adversarial network 242a is configured to learn a feature representation of decoupling based on an asymmetric causal relationship between attributes. That is, the first generative adversarial network 242a is trained in the following manner: when a first domain discrepancy feature and a second domain discrepancy feature having a causal relationship exist in the raw feature, ignoring decoupling learning with the first domain discrepancy feature during adversarial learning for the second domain discrepancy feature.

Therefore, when the first generative adversarial network 242a decouples at least two domain discrepancies that have a causal relationship, it does not forcefully decouple at least two domain discrepancies that have a causal relationship. Therefore, there is no or extremely low probability of generating negative transfer.

In phase 2, the attribute feature vectors of different attributes are randomly combined to form a new combination that does not appear in the sample, and then the second generative adversarial network 242b decouples based on additive adversarial learning to achieve further decoupling learning. That is, the second generative adversarial network is a network trained in the following manner: randomly combining different attribute feature vectors extracted by the first generative adversarial network 242a from the training set, and combining the attribute combinations that do not appear in the training set, and then performing additive adversarial training.

Therefore, by combining random combinations into a sample combination that does not appear in the training set, the second generative adversarial network 242b can fully decouple the domain discrepancies of irrelevant attributes, thereby solving the problem that due to insufficient decoupling of domain discrepancies of irrelevant attributes, there are still too many attribute dependencies in the learned features.

The first generative adversarial network 242a can be implemented separately, that is, the second generative adversarial network 242b is an optional part.

First Generative Adversarial Network 242a

Figure 5:
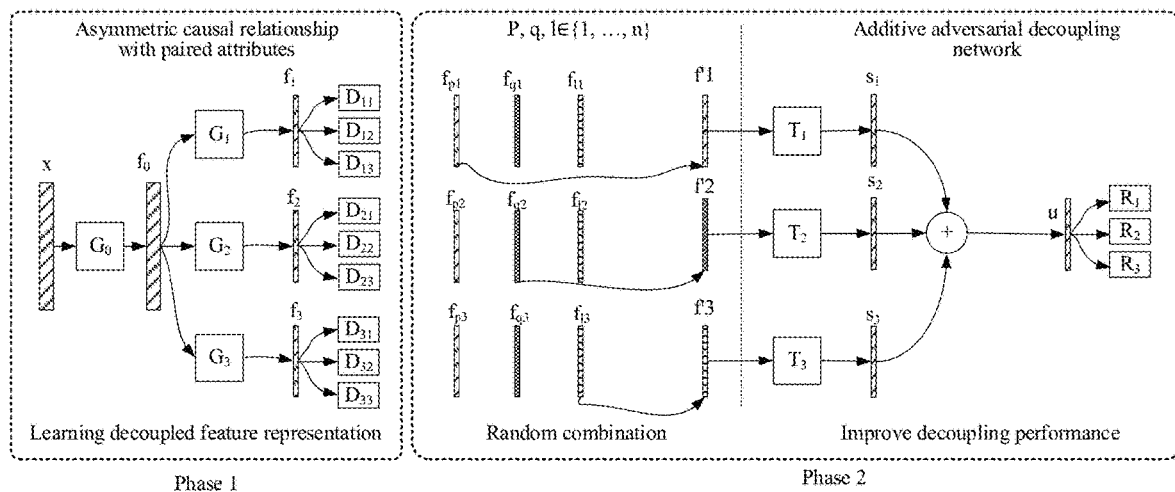
FIG. 5 is a network structure diagram of a first generative adversarial network and a second generative adversarial network provided by an exemplary embodiment of this disclosure.
Figure 6:
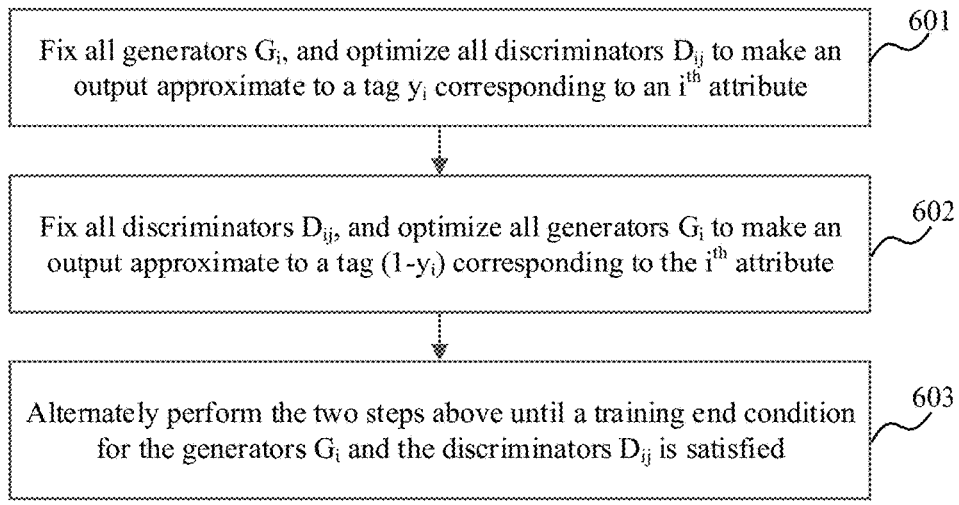
FIG. 6 is a flowchart of a method for training a first generative adversarial network provided by an exemplary embodiment of this disclosure.

Referring to FIG. 5, the first generative adversarial network 242a includes: a basic generator $G_0$, m generators (also called attribute feature learning networks) $G_1$ to $G_m$, and m*m discriminators $D_{11}$ to $D_{33}$.

The basic generator $G_0$ is configured to convert a raw feature x to obtain a global attribute feature vector $f_0$.

Each generator $G_j$ corresponds to m discriminators $D_{j1}$ to $D_{jm}$, and a $j^{th}$ generator $G_j$ is configured to learn a feature of a $j^{th}$ attribute, the attribute including an identity and m−1 domains. The number of generators is the same as the number of attributes m, m is an integer greater than 2 (taking m=3 as an example in FIG. 5, but not limited to 3), that is, the attribute in FIG. 5 includes an identity and at least two domains.

Each of the generators $G_1$ and $G_m$ is configured to extract discrimination information associated with the current attribute, so as to learn an attribute feature vector obtained after the attribute is decoupled from other attributes. For $j \in [m]$, the $j^{th}$ generator is associated with the $j^{th}$ attribute.

The adversarial learning method designed by this disclosure includes: each attribute feature vector only including the discrimination information associated with the attribute. This disclosure considers a given matrix $\Lambda \in R^{m*m}$, which includes the causal relationships between every two attributes. Then for each $j \in [m]$, this disclosure constructs m discrimination networks $D_{j1}, \ldots, D_{jm}$ to process the causal relationship between the $j^{th}$ attribute and the m attributes. Each $D_{ii}$ is configured to learn a feature of an $i^{th}$ attribute, and each $D_{ij}$ is configured to eliminate the feature of the $j^{th}$ attribute in the adversarial learning of the $i^{th}$ attribute.

The generator $G_1$ corresponding to the identity can be called a primary generator, and the other generators $G_2$ and $G_3$ separately correspond to a domain. Each generator also corresponds to n discriminators, and the discriminator $D_{11}$ can be called a primary discriminator.

The primary generator $G_1$ is configured to perform feature extraction on the global attribute feature vector $f_0$ to obtain a first primary attribute feature vector $f_1$. When the first generative adversarial network 242a is used alone as an identity authentication model, the primary discriminator $D_{11}$ is configured to perform identity authentication on the first primary attribute feature vector $f_1$ to obtain an identity authentication result; when the first generative adversarial network 242a and the second generative adversarial network 242b are cascaded as an identity authentication model, the primary discriminator $D_{11}$ is configured to perform a first discrimination on the first primary attribute feature vector $f_1$ and then output a combined attribute feature vector $f_1$ to the second generative adversarial network 242b.

The following parameters are defined based on FIG. 5:

[k]: A set of subscripts $\{1, 2, \ldots, k\}$;

[−i]: A set of subscripts with an $i^{th}$ element removed;

n: Number of samples;

m: Number of attributes;

d: Number of feature dimensions;

$Y \in R^{n*n}$: Output/attribute/tag matrix, including n independent samples $y_i$, $i \in [n]$; and $X \in R^{n*d}$: Input/feature matrix, including n independent samples $x_i$, $i \in [n]x_i$, $i \in [n]$.

This disclosure allows Y to include missing values, defining $\Omega = \{(i,j): i \in [n], j \in [m], y_{ij}$ is an observed tag value$\}$ is a set of subscripts of the observed tags. The model is trained on a corresponding feature and attribute tag.

This disclosure assumes that the values in Y are all categorical variables, that is, for each $j \in [m]$, $y_{ij} \in [k_j]$.

Generally, assume that a first column of Y is an identity tag, and the other columns are a plurality of domain discrepancy tags.

Training of the First Generative Adversarial Network 242a

The training of the first generative adversarial network 242a is the training process of a typical adversarial learning network, and the generators $G_0$ to $G_m$ are used for feature extraction. The discriminators $D_{11}$ to $D_{mm}$ are divided into two categories: for all i, $j \in [m]$, $i \neq j$, (1) each discriminator $D_{ii}$ is configured to learn a feature of an $i^{th}$ attribute, and each discriminator $D_{ij}$ is configured to eliminate the feature of the $j^{th}$ attribute; and (2) the learning of each discriminator $D_{ii}$ is standard supervised learning, and the learning of each discriminator $D_{ij}$ is adversarial learning.

The adversarial learning process for the discriminator $D_{ij}$ can be regarded as the following two alternate steps:

Step 601. Fix all $G_i$, and optimize $D_{ij}$ to make an output approximate to a corresponding one-hot encoding tag $y_j$.

Step 602. Fix all $D_{ij}$, and optimize all $G_i$ to make an output approximate to a corresponding tag $(1-y_j)$.

In response to a causal relationship between an $a^{th}$ attribute and a $b^{th}$ attribute, back-propagation of an output loss of the discriminator $D_{ab}$ is skipped, i, j, j'$\in$[m].

Step 603. Alternately perform the two steps above until a training end condition for the generators $G_i$ and the discriminators $D_{ij}$ is satisfied.

Exemplarily, the condition to terminate the training includes: the loss function converges to a target value, or the number of trainings reaches a preset number.

The ultimate goal of adversarial learning in phase 1 is to enable all $G_i$ to extract the feature of the $i^{th}$ attribute corresponding thereto, but not the features of other attributes corresponding thereto. In this way, the $i^{th}$ attribute can be decoupled from other attributes.

The optimization problem of the adversarial learning of the first generative adversarial network 242a is as follows.

The optimization problem of attribute learning, i.e., the loss function of the generator $G_i$:

$$\min_{G_0, \{G_j\}, \{D_{jj}\}} \sum_{(i,j) \in \Omega} \omega_j \mathcal{L}_{at}(D_{jj}(G_j(G_0(x_i))), y_{ij})$$

where $\mathcal{L}_{at}$ is the loss function of attribute learning, $w_j$ is the weight of the $j^{th}$ attribute, $G_0$ is the basic generator, $G_j$ is the generator corresponding to the $j^{th}$ attribute, $D_{jj}$ is the $jj^{th}$ discriminator, and j belongs to [m].

The discriminative learning of domain discrepancies, i.e., the loss function of the discriminator:

$$\min_{\{D'_{jj'}\}} \sum_{(i,j) \in \Omega} \sum_{j' \neq j} \tilde{\omega}'_{jj'} \Lambda'_{jj'} \mathcal{L}_{ad}(D'_{jj'}(G_j(G_0(x_i))), \tilde{y}'_{ij})$$

where $\tilde{y}_{ij'}$ is the one-hot encoding vector of $y_{ij'}$, $\mathcal{L}_{ad}$ is the loss function of the adversarial learning, $\tilde{w}_{ij'}$ is the weight of the (j,j') attribute pair, j,j' belongs to [m+1], and $x_i$ is the raw feature in the training set.

The third step is to eliminate domain discrepancies:

$$\min_{G_0, \{G_j\}} \sum_{(i,j) \in \Omega} \sum_{j' \neq j} \tilde{\omega}'_{jj'} \Lambda'_{jj'} \mathcal{L}_{ad}(D'_{jj'}(G_j(G_0(x_i))), z'_{ij})$$

where $\tilde{z}_{ij} = 1_{kj'} - \tilde{y}_{ij'}$, $1_{kj'}$ is an all-1 vector with a dimension of $k_{j'}$.

In the third step, this disclosure may also strengthen attribute learning at the same time:

$$\min_{G_0} \sum_{(i,j) \in \Omega} \tilde{\omega}_{jj} \mathcal{L}_{ad}(D_{jj}(G_j(G_0(x_i))), \tilde{y}_{ij})$$

According to the strategy using the asymmetric causal relationship in this disclosure, when the change of attribute j' may cause the change of attribute j, this disclosure makes $\Lambda_{jj} = 0$, otherwise makes $\Lambda_{jj} = 1$. In other words, in response to a causal relationship between a $j'^{th}$ attribute and the $j^{th}$ attribute, back-propagation of an output loss of the discriminator $D_{jj'}$ is skipped, i, j, j'$\in$[m].

Figure 7:
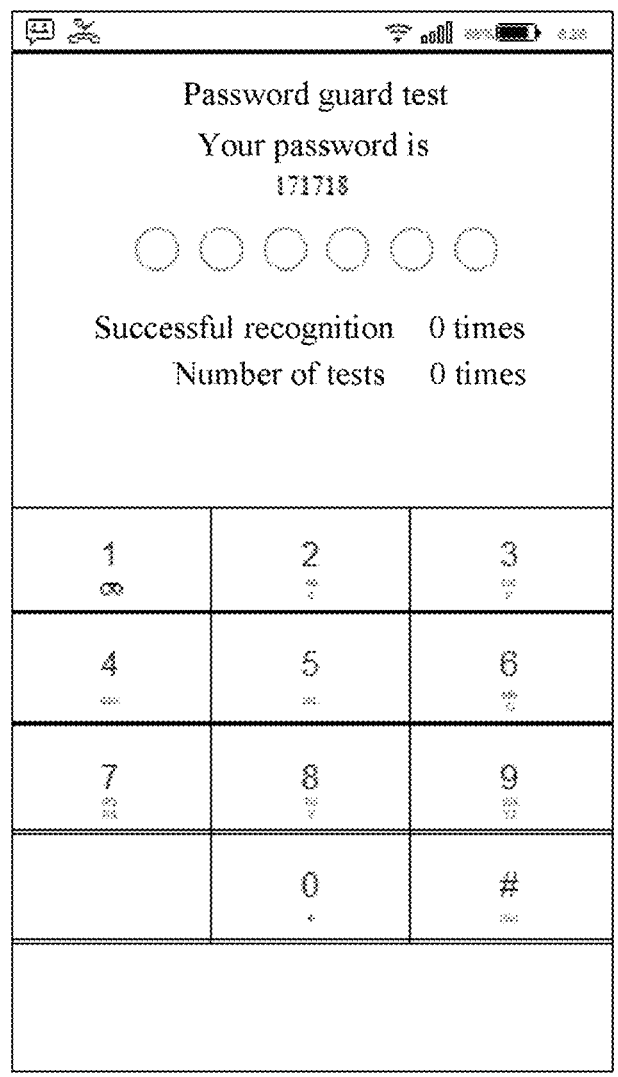
FIG. 7 is a schematic diagram of an interface of identity authentication software provided by an exemplary embodiment of this disclosure.

An activation function of the last layer of the discrimination network is softmax, $\mathcal{L}_{at}$ is the cross-entropy loss, and $\mathcal{L}_{ad}$ is the mean squared error loss. The above 4 optimization problems are performed sequentially in cycles. In each cycle, the first two optimization problems are optimized into 1 step, and the last two optimization problems are optimized into 5 steps. In the example as shown in FIG. 7, terminal sensor data is adopted for identity authentication. Taking the terminal being a smart phone as an example, the smart phone is equipped with a gravity acceleration sensor and a gyroscope sensor. When the user clicks on a password "171718" on a screen, the gravity acceleration sensor and the gyroscope sensor may acquire the user's operating features, and in turn, sensor data is generated, which can be used for authenticating the identity of the user. However, since the operating system and body thickness of each terminal are different, different operating systems may report sensor data in different data formats, and different body thicknesses may also affect the sensor data acquired by the sensor. Therefore, in the example of FIG. 8, it is assumed that the first generative adversarial network 242a includes a basic generator $G_0$, a primary generator $G_1$, a secondary generator $G_2$, and a secondary generator $G_3$. In this example, a network corresponding to the primary generator $G_1$ conducts supervised learning for identity recognition, and conducts adversarial learning for system discrimination and thickness discrimination, so that the feature extracted by the primary generator $G_1$ only includes information about identity recognition, and does not include the features of the system discrimination and thickness discrimination. Similarly, the feature extracted by the secondary generator $G_2$ only includes the features of system discrimination, and it does not include the features of identity recognition and thickness recognition. Similarly, the feature extracted by the secondary generator $G_3$ only includes the features of thickness discrimination.

This disclosure uses the causal relationship between every two attributes. Specifically, for each attribute, this disclosure selects a subset of all other attribute sets for decoupling. The selection is based on the causal relationship between each attribute and other attributes, that is, when other attributes are not the cause of the attribute change, other attributes can be decoupled from the attribute. This technique enables the method of this disclosure to flexibly select attributes, thereby avoiding negative transfer caused by forced decoupling of all other attributes (especially attributes with causal relationships), and avoiding attribute dependency caused by too few decoupling attributes. Taking FIG. 8 as an example, if the thickness change may cause the system change, then the attribute, i.e., the system discrimination, cannot be decoupled from the thickness discrimination. However, for thickness discrimination, the system change is not the cause of the thickness change, so the attribute, i.e., the thickness discrimination, can be decoupled from the attribute, i.e., the system discrimination, to form the structure shown in FIG. 8. In the network of the secondary generator $G_2$, an adversarial target of the thickness discrimination is removed. However, the network of the secondary generator $G_3$ may not remove an adversarial target of the system discrimination.

Figure 8:
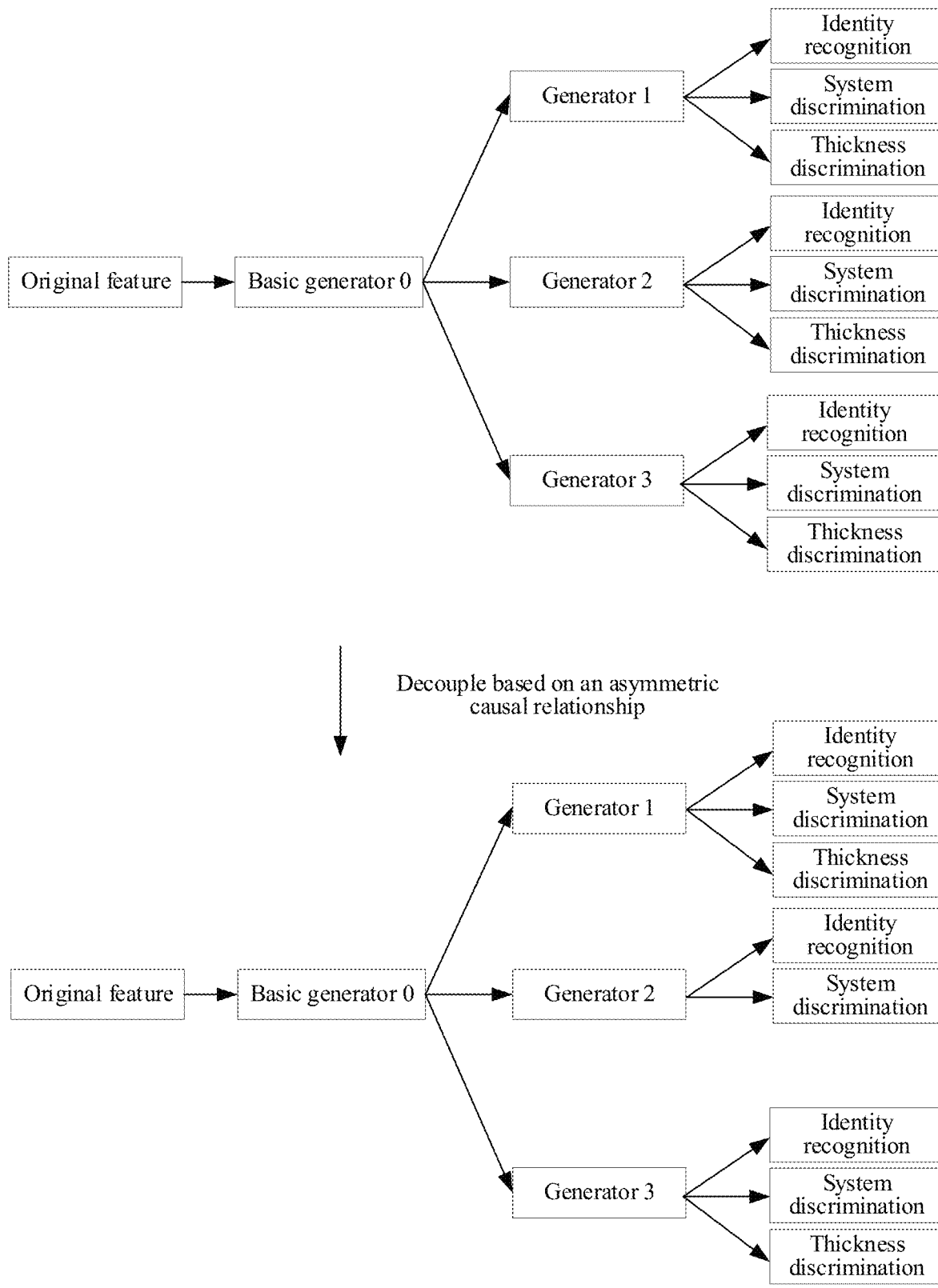
FIG. 8 is a schematic diagram of a network architecture for decoupling learning based on a causal relationship provided by an exemplary embodiment of this disclosure.

Using the above-mentioned asymmetric causal relationship is: taking FIG. 8 as an example, when the thickness change definitely causes a system change, if the feature in the secondary generator $G_2$ can be recognized for the system change, the thickness change may be necessarily recognized. In response to the thickness change, it may definitely cause a system change that can be recognized, and eventually cause the thickness change to be recognized. However, on the contrary, there is no such relationship.

Second Generative Adversarial Network 242b

As shown in FIG. 5, the second generative adversarial network 242b includes m additive spatial transformer networks $T_1$ to $T_m$, and m recognition networks $R_1$ to $R_m$.

The combined attribute feature vectors generated by the first generative adversarial network 242a are respectively converted into m additive feature vectors $s_1, \ldots, s_m$ by m additive spatial transformer networks $T_1$ to $T_m$. The m additive feature vectors are added to form a sum feature vector u, which is then transmitted to m recognition networks $R_1, \ldots, R_m$ for recognition, respectively corresponding to m attributes.

An additive spatial transformer network $T_1$ corresponding to the identity recognition in the m additive spatial transformer networks can also be called a primary additive spatial transformer network, and a recognition network $R_1$ corresponding to the identity recognition in the m recognition networks can also be called a primary recognition network.

Training of the Second Generative Adversarial Network 242b

Figure 9:
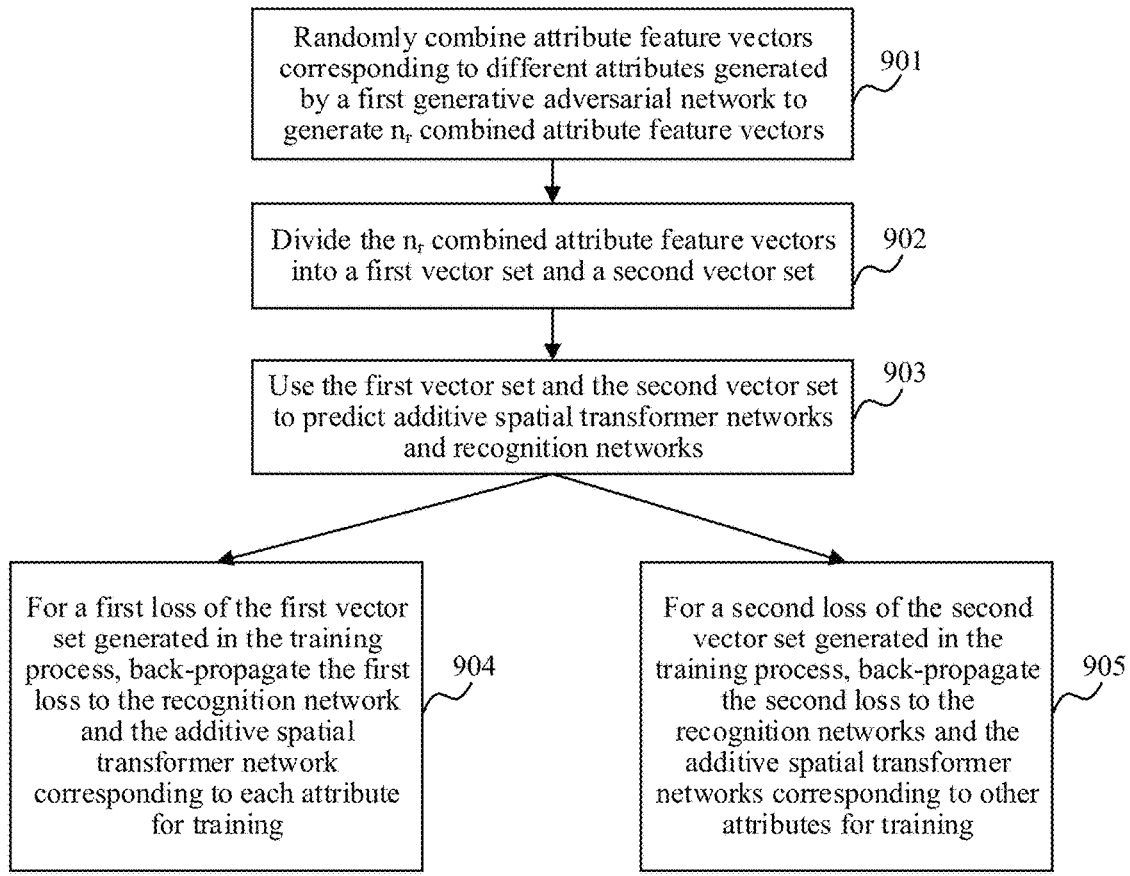
FIG. 9 is a flowchart of a method for training a second generative adversarial network provided by an exemplary embodiment of this disclosure.

FIG. 9 is a flowchart of a method for training a second generative adversarial network 242b provided by an exemplary embodiment of this disclosure. The method includes the following steps:

Step 901. Randomly combine attribute feature vectors corresponding to different attributes generated by a first generative adversarial network to generate $n_r$ combined attribute feature vectors.

Step 902. Divide the $n_r$ combined attribute feature vectors into a first vector set and a second vector set, an attribute combination of the combined attribute feature vectors in the first vector set being an attribute combination appearing in the training set, and an attribute combination of the combined attribute feature vectors in the second vector set being an attribute combination that does not appear in the training set.

Attribute feature vectors corresponding to different attributes generated by the first generative adversarial network 242a are randomly combined to generate $n_r$ combined attribute feature vectors, the combined attribute feature vectors respectively corresponding to attribute combinations and being divided into two subsets according to the attribute combinations: an attribute combination appearing in the training set and an attribute combination that does not appear in the training set. The following two sets of subscripts $\Omega_s$ and $\Omega_u$ are defined:

$\Omega_s = \{i \in n_r\}$: a subscript of an attribute combination that does not appear in set; and $\Omega_u = \{i \in n_r\}$: a subscript of an attribute combination appearing in the training the training set.

Step 903 Use the first vector set and the second vector set to predict additive spatial transformer networks and recognition networks.

A $j^{th}$ additive spatial transformer network is configured to convert a $j^{th}$ combined attribute feature vector into a $j^{th}$ additive feature vector, and a $j^{th}$ recognition network is configured to perform tag recognition corresponding to the $j^{th}$ attribute on a sum feature vector of m additive feature vectors.

Step 904. For a first loss of the first vector set generated in the training process, back-propagate the first loss to the recognition network and the additive spatial transformer network corresponding to each attribute.

For each $j \in [m]$, the following optimization problem is optimized:

$$\min_{R_j, T_j} \sum_{i \in \Omega_s} \omega'_j \mathcal{L}_r(R_j(u_i), \tilde{y}_{ij})$$

$$\text{s.t.} u_i = \sum_{j=1}^{m} T'_j(\tilde{f}'_{ij}),$$

where $\mathcal{L}_r$ is the recognition loss function, and $w'_j$ is the weight of the attribute j. $R_j$ is the additive spatial transformer network corresponding to the $j^{th}$ attribute, $T_j$ is the recognition network corresponding to the $j^{th}$ attribute, $T_{j'}$ is the recognition network corresponding to the $j'^{th}$ attribute, and is the hidden-layer feature vector of the $j'^{th}$ attribute of an $i^{th}$ sample, and symbol "~" represents random combination. s.t. is the abbreviation of subject to, which means that $u_i$ satisfies a constraint condition.

Step 905. For a second loss of the second vector set generated in the training process, back-propagate the second loss to the recognition networks and the additive spatial transformer networks corresponding to other attributes.

For each $j \in [m]$, the following optimization problem is optimized:

$$\min_{R_j, T_{[-j]}} \sum_{i \in \Omega_u} \omega'_j \mathcal{L}_r(R_j(u_i), \tilde{y}_{ij})$$

$$\text{s.t.} u_i = \sum_{j'=1}^{m} T'_j(\tilde{f}'_{ij}),$$

where $\mathcal{L}_r$ is the recognition loss function, and $w'_j$ is the weight of the attribute j. $R_j$ is the additive spatial transformer network corresponding to the $j^{th}$ attribute, $T_j$ is the recognition network corresponding to the $j^{th}$ attribute, $T_{j'}$ is the recognition network corresponding to the $j^{th}$ attribute, and $f_{ij'}$ is the hidden-layer feature vector of the $j^{th}$ attribute of an $i^{th}$ sample, and symbol "~" represents random combination. s.t. is the abbreviation of subject to, which means that $u_i$ satisfies a constraint condition.

The last activation function of all recognition networks (R networks) is also a softmax function. $\mathcal{L}_r$ is the cross-entropy loss function.

Figure 10:
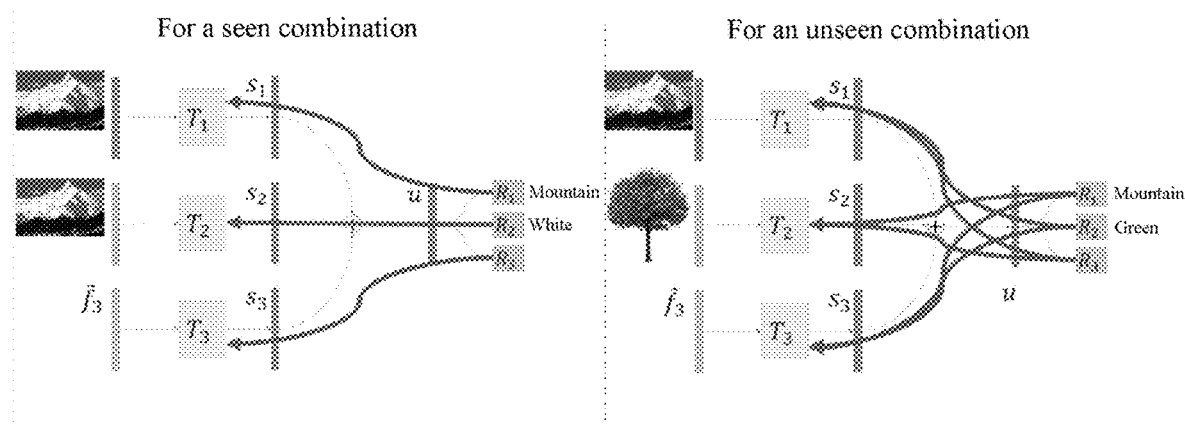
FIG. 10 is a schematic diagram of the training principle of a second generative adversarial network provided by an exemplary embodiment of this disclosure.

The optimization mechanism of the additive adversarial network is as shown in FIG. 10. It is assumed that the first two attributes are: object category and color category. The first two branches of the additive adversarial network correspond to the learning of the two attributes in turn. First, it is assumed that a seen attribute combination is trained. For example, a white mountain can be accurately recognized as the object "mountain" and the color "white". Then, for an unseen attribute combination, a white mountain and a green tree, this disclosure requires the network to output the object "mountain" and the color "green". On the assumption that the previously seen combination is trained, if the outputted color is not "green" now, then there are reasons to believe that an error comes from the "white" information in a first branch of the network. Then, this disclosure returns a color error generated by an output of a second branch to the first branch to eliminate the color information therein. In this way, a domain discrepancy generated by the color information in the first branch is eliminated.

In the above training set, each user group corresponds to only one domain, such as a device type. The division of user groups is made based on the domain discrepancies. A model trained on one domain is tested on another domain, and each user group only considers the difference of one domain, as shown in Table II. In practical applications, there may be differences in a plurality of domains. For example, for face authentication, the differences in glasses, hairstyles, and beards are domain discrepancies.

TABLE II

|  | User group 1 | User group 2 | User group 3 |
|---|---|---|---|
| Domain 1 | Train | Test | Test |
| Domain 2 | Test | Test | Train |
| Domain 3 | Test | Train | Test |

As an example of this disclosure, the basic generator $G_0$, m generators (also called attribute feature learning networks) $G_1$ to $G_m$, and m additive spatial transformer networks $T_1$ to $T_m$ in the foregoing embodiments may be any neural networks.

As an example of this disclosure, the last activation functions of the discriminators, m*m discriminators $D_{11}$ to $D_{33}$, and m recognition networks $R_1$ to $R_m$ in the above embodiments may be any one of a softmax function, a sigmoid function, a tanh function, a linear function, a swish activation function, and a relu activation function.

As an example of this disclosure, the loss functions (including $\mathcal{L}_{at}$ and $\mathcal{L}_{ad}$ in phase 1 and $\mathcal{L}_r$ in phase 2) can be a cross entropy loss, a logistic loss, a mean square loss, a square loss, $\ell_2$ norm loss, and $\ell_1$ norm loss.

As an example of this disclosure, for $\tilde{z}_{ij}=1_{kj'}-\tilde{y}_{ij'}$ in each embodiment, where $\tilde{z}_{ij}$ is an all-1 vector with a dimension of $k_{j'}$. $\tilde{z}_{ij}$, here can also be replaced with four other vectors with a dimension of $k_j'$:
(1) all-0 vector;
(2) all-1 vector;
(3) all-0.5 vector; and
(4) for $r\in[k_{j'}]$, an $r^{th}$ dimension takes $$\frac{1}{n}\sum_{i=1}^{n}I(y_{ij'}=r),$$

where I(•) is the indicative function, that is, the value is taken according to a priori probability of a tag on the training set.

Identity Authentication Phase

Figure 11:
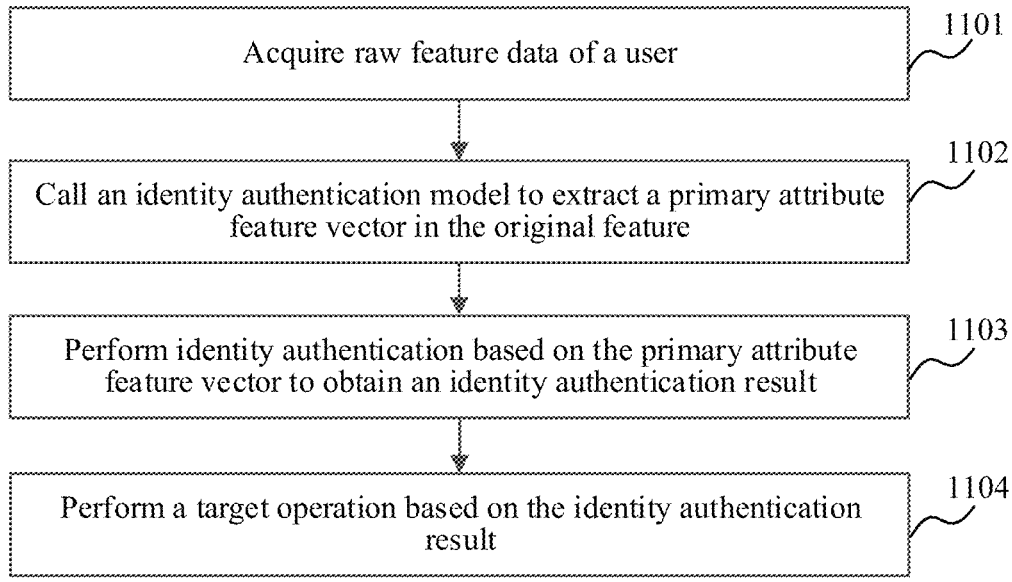
FIG. 11 is a flowchart of an identity authentication method provided by an exemplary embodiment of this disclosure.

FIG. 11 is a flowchart of an identity authentication method provided by an exemplary embodiment of this disclosure. The method can be executed by a server as shown in FIG. 1. The method includes the following steps:

Step 1101. Acquire a raw feature of a user, the raw feature containing m−1 domain discrepancy features.

The domain is a factor that causes an overall distribution deviation of a subset of samples in a training set. The domain includes, but is not limited to, at least two of hair color, beard, glasses, model, operating system, body thickness, and application type. m is an integer greater than 2.

Step 1102. Extract a primary attribute feature vector in the raw feature, the primary attribute feature vector being an unbiased feature representation for selectively decoupling the m−1 domain discrepancy features in the raw feature.

Exemplarily, the server calls an identity authentication model to extract the primary attribute feature vector in the raw feature. The identity authentication model includes:
a first generative adversarial network, or the first generative adversarial network and a second generative adversarial network, where
the first generative adversarial network is a network trained by selectively decoupling the m−1 domain discrepancy features based on a causal relationship, and the second generative adversarial network is a network trained by performing additive adversarial training on a random combination of attribute feature vectors of different attributes extracted by the first generative adversarial network.

Step 1103. Perform identity authentication based on the primary attribute feature vector to obtain an identity authentication result.

Exemplarily, the server calls the identity authentication model to perform identity authentication based on the primary attribute feature vector to obtain an identity authentication result.

Step 1104. Perform a target operation based on the identity authentication result.

The target operation can be a sensitive operation related to identity authentication. Target operations include, but are not limited to: unlocking a lock screen interface, unlocking a confidential space, authorizing a payment behavior, authorizing a transfer behavior, authorizing a decryption behavior, and so on.

The embodiments of this disclosure do not limit the specific operation form of the "target operation".

Figure 12:
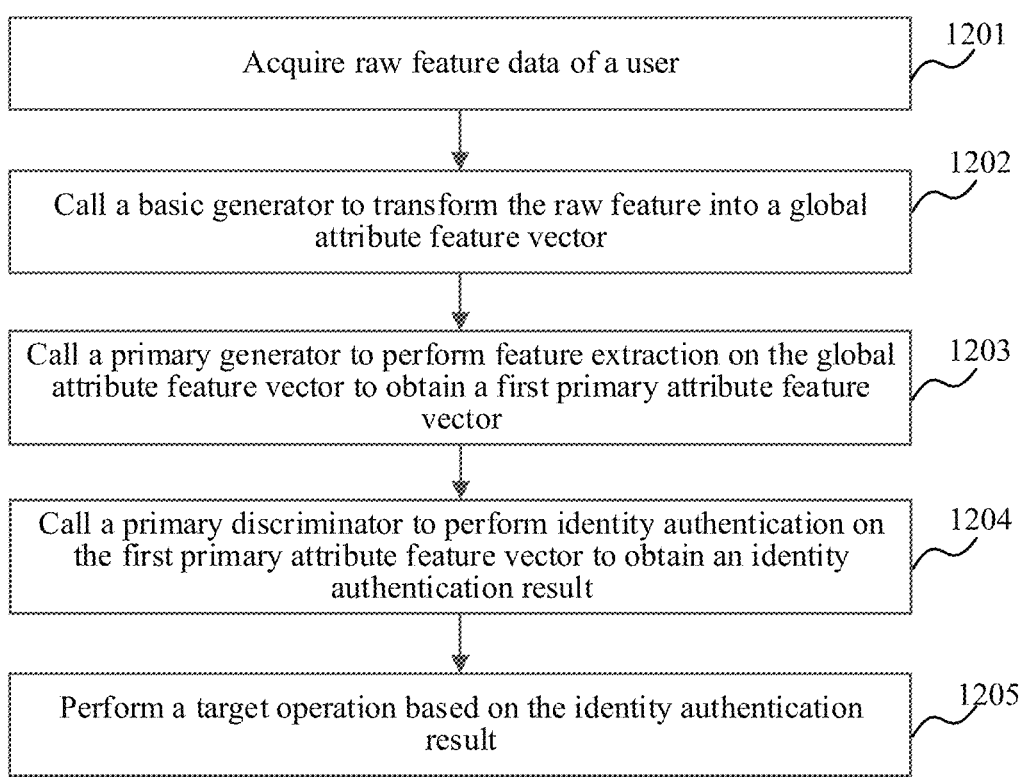
FIG. 12 is a flowchart of an identity authentication method provided by an exemplary embodiment of this disclosure.

In conclusion, the method provided in this embodiment extracts the primary attribute feature vector in the raw feature through the identity authentication model, and performs identity authentication based on the primary attribute feature vector to obtain the identity authentication result. Because the primary attribute feature vector is an unbiased feature representation for selectively decoupling a plurality of domain discrepancy features in the raw feature, the influence of the plurality of domain discrepancy features on the identity authentication process is eliminated as much as possible, even if there are domain discrepancies in the raw features (such as growing a beard, changing a hairstyle), identity authentication can be accurately achieved. In the identity authentication phase, for the first generative adversarial network, only the basic generator, the primary generator and the primary discriminator in the first generative adversarial network are required. For the second generative adversarial network, only the primary additive spatial transformer network and the primary recognition network are required. Taking the first generative adversarial network alone serving as the identity authentication model as an example, reference is made to the following embodiments for the corresponding identity authentication method. The first generative adversarial network includes a basic generator, a primary generator, and a primary discriminator. FIG. 12 is a flowchart of an identity authentication method provided by another exemplary embodiment of this disclosure. The method can be executed by the server as shown in FIG. 1. The method includes the following steps:

Step 1201. Acquire a raw feature of a user, the raw feature containing m−1 domain discrepancy features, m being an integer greater than 2.

Step 1202. Call a basic generator to transform the raw feature into a global attribute feature vector.

The basic generator $G_0$ is configured to convert a raw feature x to obtain a global attribute feature vector $f_0$, as shown in FIG. 5. The global attribute feature vector $f_0$ is mixed with identity attribute features and m−1 domain discrepancy features.

Step 1203. Call a primary generator to perform feature extraction on the global attribute feature vector to obtain a first primary attribute feature vector.

The primary generator $G_1$ is configured to perform feature extraction on the global attribute feature vector $f_0$ to obtain a first primary attribute feature vector $f_1$. The first primary attribute feature vector $f_1$ is a feature vector corresponding to the identity attribute (decoupling m−1 domain discrepancy features). The first primary attribute feature vector $f_1$ is an unbiased feature representation for selectively decoupling the m−1 domain discrepancy features in the raw feature.

Step 1204. Call a primary discriminator to perform identity authentication on the first primary attribute feature vector to obtain an identity authentication result.

The primary discriminator $D_{11}$ is configured to perform identity tag prediction on the first primary attribute feature vector, and output a corresponding identity tag. The identity tag includes: belonging to an identity tag i, or not belonging to any existing identity tag.

Step 1205. Perform a target operation based on the identity authentication result.

The target operation can be a sensitive operation related to identity authentication. Target operations include, but are not limited to: unlocking a lock screen interface, unlocking a confidential space, authorizing a payment behavior, authorizing a transfer behavior, authorizing a decryption behavior, and so on.

The embodiments of this disclosure do not limit the specific operation form of the "target operation".

In conclusion, the method provided in this embodiment performs unbiased identity authentication through the first generative adversarial network. When the first generative adversarial network decouples at least two domain discrepancies that have a causal relationship, it does not forcefully decouple at least two domain discrepancies that have a causal relationship. Therefore, there is no or extremely low probability of generating negative transfer, and the at least two domain discrepancies that have a causal relationship can be better decoupled, so as to obtain better unbiased identity authentication result.

Taking the first generative adversarial network and the second generative adversarial network being cascaded as the identity authentication model as an example, reference is made to the following embodiments for the corresponding identity authentication method. The first generative adversarial network includes a basic generator, a primary generator and a primary discriminator. The second generative adversarial network includes a primary additive spatial transformer network and a primary recognition network.

Figure 13:
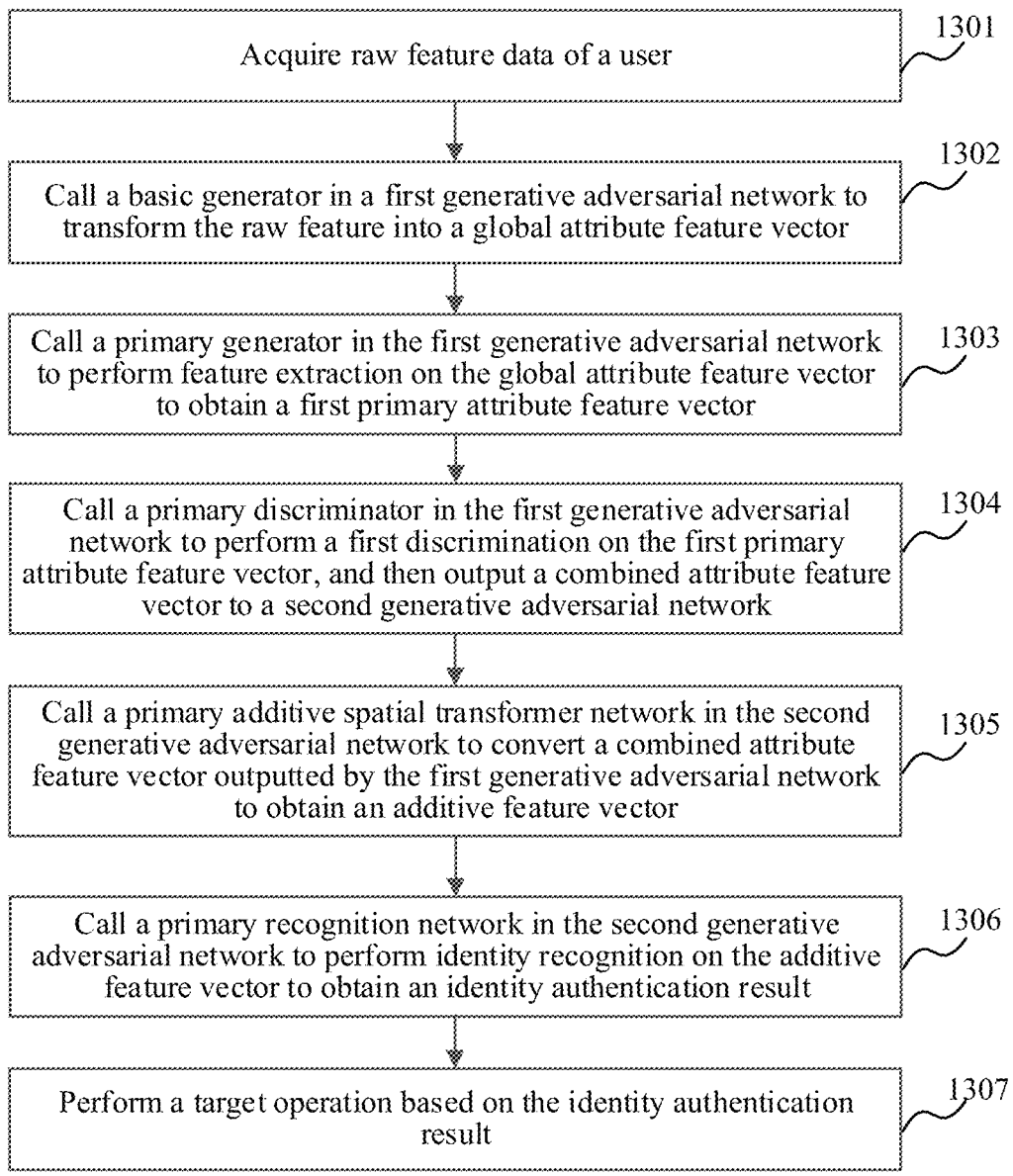
FIG. 13 is a flowchart of an identity authentication method provided by an exemplary embodiment of this disclosure.

FIG. 13 is a flowchart of an identity authentication method provided by another exemplary embodiment of this disclosure. The method can be executed by the server as shown in FIG. 1. The method includes the following steps:

Step 1301. Acquire a raw feature of a user, the raw feature containing m−1 domain discrepancy features, m being an integer greater than 2.

Step 1302. Call the basic generator in the first generative adversarial network to transform the raw feature into a global attribute feature vector.

The basic generator $G_0$ is configured to convert a raw feature x to obtain a global attribute feature vector $f_0$, as shown in FIG. 5. The global attribute feature vector $f_0$ is mixed with identity attribute features and m−1 domain discrepancy features.

Step 1303. Call the primary generator in the first generative adversarial network to perform feature extraction on the global attribute feature vector to obtain a first primary attribute feature vector.

The primary generator $G_1$ is configured to perform feature extraction on the global attribute feature vector $f_0$ to obtain a first primary attribute feature vector $f_1$. The first primary attribute feature vector $f_1$ is a feature vector corresponding to the identity attribute (decoupling m−1 domain discrepancy features). The first primary attribute feature vector $f_1$ is an unbiased feature representation for selectively decoupling the m−1 domain discrepancy features in the raw feature.

Step 1304. Call the primary discriminator in the first generative adversarial network to perform a first discrimination on the first primary attribute feature vector, and then output a combined attribute feature vector to the second generative adversarial network.

The primary discriminator $D_{11}$ is configured to perform a first discrimination on the first primary attribute feature vector $f_1$, and then output a combined attribute feature vector $f'_1$ to the second generative adversarial network.

Step 1305. Call the primary additive spatial transformer network in the second generative adversarial network to convert a combined attribute feature vector outputted by the first generative adversarial network to obtain an additive feature vector.

The primary additive spatial transformer network $T_1$ is configured to convert a combined attribute feature vector $f'_1$ outputted by the first generative adversarial network to obtain an additive feature vector $S_1$.

Step 1306. Call the primary recognition network in the second generative adversarial network to perform identity recognition on the additive feature vector to obtain an identity authentication result.

The primary recognition network $R_1$ is configured to perform identity tag prediction on the additive feature vector $S_1$, and output a corresponding identity tag. The identity tag includes: belonging to an identity tag i, or not belonging to any existing identity tag.

Unlike FIG. 5, there is no need to perform a random combination process and an addition process of a plurality of additive feature vectors in the prediction phase.

Step 1307. Perform a target operation based on the identity authentication result.

The target operation can be a sensitive operation related to identity authentication. Target operations include, but are not limited to: unlocking a lock screen interface, unlocking a confidential space, authorizing a payment behavior, authorizing a transfer behavior, authorizing a decryption behavior, and so on.

The embodiments of this disclosure do not limit the specific operation form of the "target operation".

In conclusion, the method provided in this embodiment performs unbiased identity authentication through the first generative adversarial network. When the first generative adversarial network decouples at least two domain discrepancies that have a causal relationship, it does not forcefully decouple at least two domain discrepancies that have a causal relationship. Therefore, there is no or extremely low probability of generating negative transfer, and the at least two domain discrepancies that have a causal relationship can be better decoupled, so as to obtain better unbiased identity authentication result.

The method provided in this embodiment also performs unbiased identity authentication by cascading the second generative adversarial network behind the first generative adversarial network. Because the second generative adversarial network fully decouples the domain discrepancies of irrelevant attributes, the problem that due to insufficient decoupling of domain discrepancies of irrelevant attributes, there are still too many attribute dependencies in the learned features is solved, so that even if there are implicit relationship attributes between a plurality of domain discrepancies, the plurality of domain discrepancies can still be better decoupled, thereby improving decoupling performance and obtaining a better unbiased identity authentication result.

The identity authentication method provided in this disclosure can be applied to the following scenarios:

1. Identity authentication scenario based on face recognition: during the identity authentication using the face recognition technology, the terminal may acquire a user's face image for identity recognition. For the same user, the user may choose to have a beard or no beard, long or short hair, wear glasses or no glasses, so that there are domain discrepancies in different face images of the same user. These domain discrepancy features may affect whether the authentication result of identity authentication is correct. In order to eliminate the influence of these domain discrepancy features on the identity authentication process, the identity authentication method in the above embodiments can be used, so that in response to domain discrepancy features, the identity authentication result can be obtained more accurately.

2. Identity authentication scenario based on sensor data: during the identity authentication using the sensor data, the terminal is provided with an acceleration sensor and/or a gyroscope sensor, and the user's behavior features when using the terminal are acquired through the sensor. The behavior features include: the strength of the user's click on the terminal, the frequency with which the user clicks on the terminal, and the feature of the pause rhythm when the user continuously clicks on the terminal. Due to different formats of the sensor data reported by different sensors, different operating systems have different requirements on the format of the sensor data, and the behavior features collected by terminals of different shapes and thicknesses (installed with the same sensor) are also different, and at present, the user may replace a new terminal (such as a mobile phone) once a year, which leads to domain discrepancy features when identity authentication is performed on the same user account on different terminals. These domain discrepancy features may affect whether the authentication result of identity authentication is correct. In order to eliminate the influence of these domain discrepancy features on the identity authentication process, the identity authentication method in the above embodiments can be used, so that in response to domain discrepancy features, the identity authentication result can be obtained more accurately.

3. Identity authentication scenario based on fingerprint data:

during the identity authentication using the fingerprint data, the terminal is provided with a fingerprint sensor, and the user's fingerprint features when using the terminal are acquired through the fingerprint sensor. Since the formats of fingerprint data reported by different fingerprint sensors are different, when users change terminals, there are domain discrepancy features during the identity authentication of the same user account on different terminals. These domain discrepancy features may affect whether the authentication result of identity authentication is correct. In order to eliminate the influence of these domain discrepancy features on the identity authentication process, the identity authentication method in the above embodiments can be used, so that in response to domain discrepancy features, the identity authentication result can be obtained more accurately.

4. Identity authentication scenario based on iris recognition:

during the identity authentication using the iris recognition technology, the terminal may acquire the user's iris image for identity recognition. For the same user, the user may wear contact lenses or no contact lenses, and different contact lenses may have different patterns. The domain discrepancy caused by such contact lenses may affect whether the authentication result of identity authentication is correct. In order to eliminate the influence of these domain discrepancy features on the identity authentication process, the identity authentication method in the above embodiments can be used, so that in response to domain discrepancy features, the identity authentication result can be obtained more accurately.

Apparatus embodiments of the embodiments of this disclosure are described below. For details that are not described in the apparatus embodiments, refer to the foregoing method embodiments in a one-to-one correspondence with the apparatus embodiments.

Figure 14:
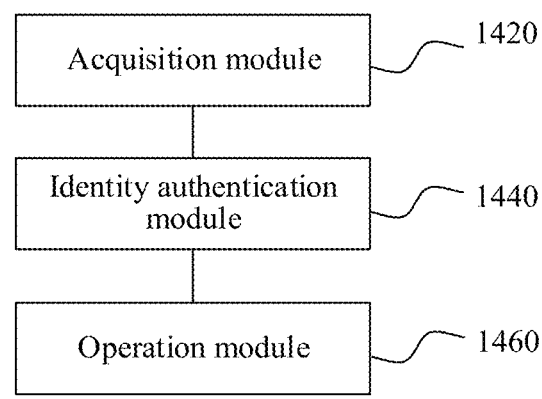
FIG. 14 is a block diagram of an identity authentication apparatus provided by an exemplary embodiment of this disclosure.

FIG. 14 is a block diagram of an identity authentication apparatus provided by an exemplary embodiment of this disclosure. The apparatus may be implemented as an entire server or a part of a server by using software, hardware, or a combination thereof. The apparatus includes:

an acquisition module 1420, configured to acquire a raw feature of a user, the raw feature containing m−1 domain discrepancy features; and an identity authentication module 1440, configured to extract a primary attribute feature vector in the raw feature, the primary attribute feature vector being an unbiased feature representation for selectively decoupling the m−1 domain discrepancy features in the raw feature, m being an integer greater than 2;

the identity authentication module 1440 being further configured to perform unbiased identity authentication based on the primary attribute feature vector to obtain an identity authentication result; and an operation module 1460, configured to perform a target operation based on the identity authentication result.

In one implementation, the identity authentication module 1440 is configured to call an identity authentication model to perform feature extraction on the raw feature, to obtain a primary attribute feature vector in the raw feature. The identity authentication model includes a first generative adversarial network, or the first generative adversarial network and a second generative adversarial network.

In one implementation, the first generative adversarial network includes a basic generator, a primary generator, and a primary discriminator.

The identity authentication module 1440 is configured to call the basic generator to transform the raw feature into a global attribute feature vector.

The identity authentication module 1440 is configured to call the primary generator to perform feature extraction on the global attribute feature vector to obtain a first primary attribute feature vector.

The identity authentication module 1440 is configured to call the primary discriminator to perform identity authentication on the first primary attribute feature vector to obtain an identity authentication result, or call the primary discriminator to perform a first discrimination on the first primary attribute feature vector, and then output a combined attribute feature vector to the second generative adversarial network.

In one implementation, the first generative adversarial network is trained in the following manner:
when a first domain discrepancy feature and a second domain discrepancy feature having a causal relationship exist in the raw feature, ignoring decoupling learning with the first domain discrepancy feature during adversarial learning for the second domain discrepancy feature.

In one implementation, the first generative adversarial network includes m generators $G_1$ to $G_m$; each of the generators $G_j$ corresponds to m discriminators $G_{j1}$ to $G_{jm}$; a $j^{th}$ generator $G_j$ is configured to learn a feature of a $j^{th}$ attribute; a generator $G_1$ corresponding to the identity is the primary generator, and a discriminator $D_{11}$ corresponding to the generator $G_1$ is the primary discriminator, i, j, j'∈[m].

The first generative adversarial network is trained in the following manner: fixing all generators $G_i$, and optimizing all discriminators $D_{ij}$ to make an output approximate to a tag $y_i$ corresponding to the $j^{th}$ attribute; fixing all discriminators $D_{ij}$, and optimizing all generators $G_i$ to make an output approximate to a tag $(1-y_i)$ corresponding to the $j^{th}$ attribute, where in response to a causal relationship between a $j'^{th}$ attribute and the $j^{th}$ attribute, back-propagation of an output loss of the discriminator $D_{jj'}$ is skipped, i, j, j'∈[m].

In one implementation, the second generative adversarial network includes a primary additive spatial transformer network and a primary recognition network.

The identity authentication module 1440 is configured to call the primary additive spatial transformer network to convert a combined attribute feature vector outputted by the first generative adversarial network to obtain an additive feature vector.

The identity authentication module 1440 is configured to call the primary recognition network to perform identity recognition on the additive feature vector to obtain an identity authentication result.

In one implementation, the second generative adversarial network is trained in the following manner:
randomly combining different attribute feature vectors extracted by the first generative adversarial network from a training set; and
performing additive adversarial training on a combined attribute feature vector obtained after the random combination, where
at least one attribute combination corresponding to the combined attribute feature vector is an attribute combination that does not appear in the training set. In one implementation, the second generative adversarial network includes m additive spatial transformer networks and m recognition networks having one-to-one correspondence to the m attributes, j∈[m].

The second generative adversarial network is trained in the following steps:
randomly combining attribute feature vectors corresponding to different attributes generated by the first generative adversarial network to generate $n_r$ combined attribute feature vectors;
dividing the $n_r$ combined attribute feature vectors into a first vector set and a second vector set, an attribute combination of the combined attribute feature vectors in the first vector set being an attribute combination appearing in the training set, and an attribute combination of the combined attribute feature vectors in the second vector set being an attribute combination that does not appear in the training set;
using the first vector set and the second vector set to predict the additive spatial transformer networks and the recognition networks, a $j^{th}$ additive spatial transformer network being configured to convert a $j^{th}$ combined attribute feature vector into a $j^{th}$ additive feature vector, and a $j^{th}$ recognition network being configured to perform tag recognition corresponding to the $j^{th}$ attribute on a sum feature vector of m additive feature vectors;
for a first loss of the first vector set generated in the prediction process, back-propagating the first loss to the recognition network and the additive spatial transformer network corresponding to each attribute; and
for a second loss of the second vector set generated in the prediction process, back-propagating the second loss to the recognition networks and the additive spatial transformer networks corresponding to other attributes.

Figure 15:
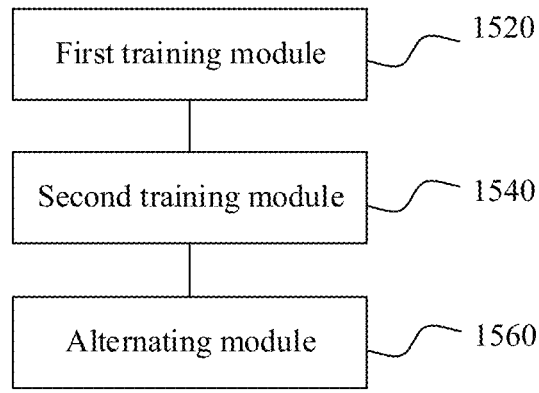
FIG. 15 is a block diagram of an apparatus for training a first generative adversarial network provided by an exemplary embodiment of this disclosure.

FIG. 15 is a block diagram of an apparatus for training a first generative adversarial network provided by an exemplary embodiment of this disclosure. The apparatus may be implemented as an entire server or a part of a server by using software, hardware, or a combination thereof. The first generative adversarial network includes m generators $G_1$ to $G_m$; each of the generators $G_j$ corresponds to m discriminators $G_{j1}$ to $G_{jm}$; and a $i^{th}$ generator $G_j$ is configured to learn a feature of a $j^{th}$ attribute, the attribute including an identity and m−1 domains, i, j, j'∈[m]. The apparatus includes:

a first training module 1520, configured to fix all generators $G_i$, and optimize all discriminators $D_{ij}$ to make an output approximate to a tag $y_i$ corresponding to the $j^{th}$ attribute;

a second training module 1540, configured to fix all discriminators $D_{ij}$, and optimize all generators $G_i$ to make an output approximate to a tag $(1-y_i)$ corresponding to the $j'^{th}$ attribute; and an alternating module 1560, configured to control the first training module 1520 and the second training module to alternately execute the two steps above until a training end condition for the generators $G_i$ and the discriminators $D_{ij}$ is satisfied, where in response to a causal relationship between a $j'^{th}$ attribute and the $j^{th}$ attribute, back-propagation of an output loss of the discriminator $D_{jj'}$ is skipped, i, j, j'∈[m].

Figure 16:
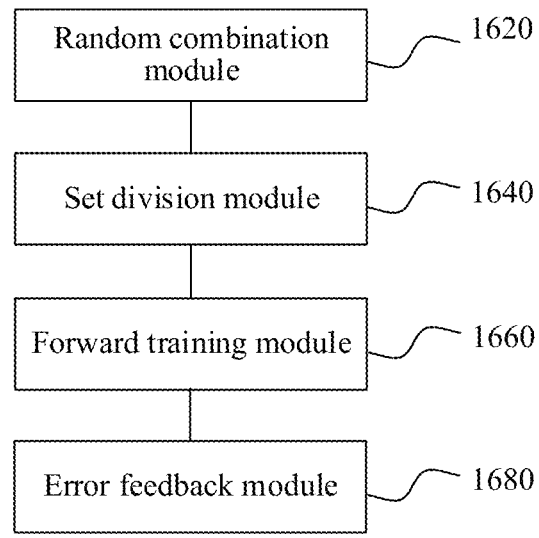
FIG. 16 is a block diagram of an apparatus for training a second generative adversarial network provided by an exemplary embodiment of this disclosure.

FIG. 16 is a block diagram of an apparatus for training a second generative adversarial network provided by an exemplary embodiment of this disclosure. The apparatus may be implemented as an entire server or a part of a server by using software, hardware, or a combination thereof. The second generative adversarial network includes m additive spatial transformer networks and m recognition networks having one-to-one correspondence to m attributes, the attributes including an identity and m−1 domain discrepancies, j∈[m], m being an integer greater than 2. The apparatus includes:

a random combination module 1620, configured to randomly combine attribute feature vectors corresponding to different attributes extracted from a training set to generate $n_r$ combined attribute feature vectors;

a set division module 1640, configured to divide the $n_r$ combined attribute feature vectors into a first vector set and a second vector set, an attribute combination of the combined attribute feature vectors in the first vector set being an attribute combination appearing in the training set, and an attribute combination of the combined attribute feature vectors in the second vector set being an attribute combination that does not appear in the training set;

a forward training module 1660, configured to use the first vector set and the second vector set to predict the additive spatial transformer networks and the recognition networks, a $j^{th}$ additive spatial transformer network being configured to convert a $j^{th}$ combined attribute feature vector into a $j^{th}$ additive feature vector, and a $j^{th}$ recognition network being configured to perform tag recognition corresponding to the $j^{th}$ attribute on a sum feature vector of m additive feature vectors; and an error feedback module 1680, configured to, for a first loss of the first vector set generated in the prediction process, back-propagate the first loss to the recognition network and the additive spatial transformer network corresponding to each attribute; and the error feedback module 1680 being configured to, for a second loss of the second vector set generated in the prediction process, back-propagate the second loss to the recognition networks and the additive spatial transformer networks corresponding to other attributes.

During the identity authentication by the identity authentication apparatus provided by the above embodiments, only the division of the functional modules above is taken as an example for description. In actual application, the functions above are all special located to different functional modules according to requirements, that is, an internal structure of the device is divided into different functional modules, so as to complete all or some of the functions above. In addition, the identity authentication apparatus provided by the above embodiments and the method embodiments of the identity authentication method belong to the same concept, and the specific implementation process is detailed in the method embodiments, and details are not repeated here.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 17:
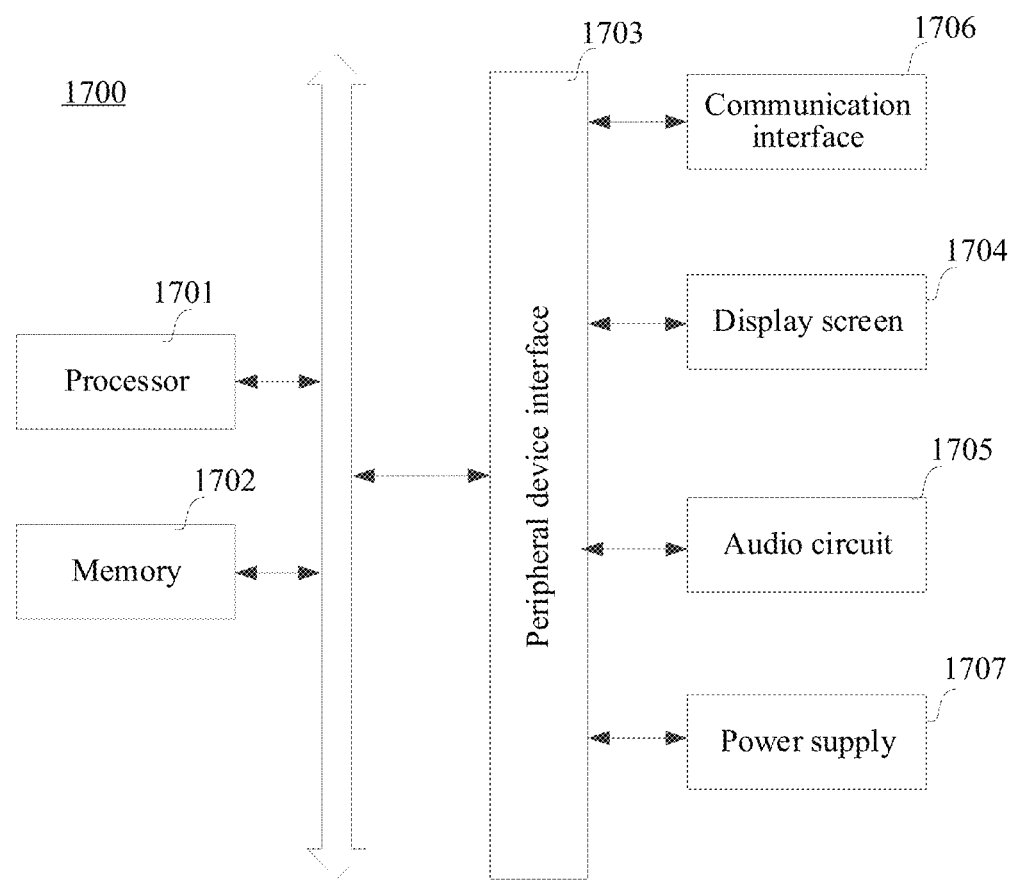
FIG. 17 is a block diagram of a computer device provided by an exemplary embodiment of this disclosure.

FIG. 17 is a schematic structural diagram of a computer device 1700 according to an exemplary embodiment of this disclosure. The computer device 1700 may be a mobile phone, a tablet computer, a smart television, a multimedia playback device, a wearable device, a desktop computer, a server, and other electronic devices. The computer device 1700 can be configured to implement any one of the identity authentication method, the method for training a first generative adversarial network, and the method for training a second generative adversarial network provided in the foregoing embodiments.

Generally, the computer device 1700 includes a processor 1701 and a memory 1702. The processor 1701 may include one or more processing cores, such as a 4-core processor and an 8-core processor. The processor 1701 may be implemented in at least one hardware form of Digital Signal Processing (DSP), Field Programmable Gate Array (FPGA), and Programmable Logic Array (PLA). The processor 1701 may also include a main processor and a co-processor. The main processor is a processor configured to process data in a wakeup state, also called a Central Processing Unit (CPU).

The co-processor is a low-power processor configured to process data in a standby state. In some embodiments, the processor 1701 may be integrated with a Graphics Processing Unit (GPU), the GPU being configured to render and draw content that needs to be displayed on a display screen. In some embodiments, the processor 1701 may also include an Artificial Intelligence (AI) processor, the AI processor being configured to process calculation operations related to machine learning. The memory 1702 may include one or more computer-readable storage media, which may be non-transitory. The memory 1702 may also include a high-speed random access memory and a non-volatile memory, such as one or more magnetic disk storage devices and flash storage devices. In some embodiments, the non-transitory computer-readable storage medium in the memory 1702 is configured to store at least one instruction, the at least one instruction, when executed by the processor 1701, implementing any one of the identity authentication method, the method for training a first generative adversarial network, and the method for training a second generative adversarial network provided in the method embodiments in this disclosure.

In some embodiments, the computer device 1700 may further include: a peripheral device interface 1703 and at least one peripheral device. The processor 1701, the memory 1702, and the peripheral device interface 1703 may be connected to each other through a bus or a signal line. Each peripheral device can be connected to the peripheral device interface 1703 through a bus, a signal line, or a circuit board. Specifically, the peripheral device may include at least one of a display screen 1704, an audio circuit 1705, a communication interface 1706, and a power supply 1707.

Those skilled in the art can understand that the structure shown in FIG. 17 does not constitute a limitation on the computer device 1700, and may include more or fewer components than shown in the figure, or combine some components, or adopt different component arrangements.

In exemplary embodiments, also provided is a computer device, including a processor and a memory, the memory storing computer-readable instructions, the computer-readable instructions, when executed by the processor, causing the processor to execute any one of the identity authentication method, the method for training a first generative adversarial network, and the method for training a second generative adversarial network.

In exemplary embodiments, also provided is a computer-readable storage medium storing computer-readable instructions, the computer-readable instructions, when executed by one or more processors, causing the one or more processors to execute the identity authentication method. Exemplarily, the computer-readable storage medium may be a Read-Only Memory (ROM), a Random Access Memory (RAM), a Compact Disc Read-Only Memory (CD-ROM), a magnetic tape, a floppy disk, an optical data storage device, or the like.

In exemplary embodiments, also provided is a computer-readable instruction product, the computer-readable instruction product, when executed, implementing any one of the identity authentication method, the method for training a first generative adversarial network, and the method for training a second generative adversarial network.

"Plurality of" mentioned in the specification means two or more. "And/or" describes an association relationship for describing associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this disclosure, and are not intended to limit this disclosure. Any modification, equivalent replacement, improvement and the like made within the spirit and principle of this disclosure shall fall within the protection scope of this disclosure.

What is claimed is:

1. An identity authentication method, executed by a computer device, the method comprising:
   acquiring a raw feature of a user, the raw feature containing m−1 domain discrepancy features, and m being an integer greater than 2;
   extracting a primary attribute feature vector in the raw feature by:
   transforming, by a basic generator, the raw feature into a global attribute feature vector; and
   performing feature extraction, by a primary generator, on the global attribute feature vector to obtain the primary attribute feature vector, the primary attribute feature vector being an unbiased feature representation by selectively decoupling the m−1 domain discrepancy features in the raw feature; and
   performing unbiased identity authentication based on the primary attribute feature vector to obtain an identity authentication result by a step comprising performing the identity authentication, by a primary discriminator, on the primary attribute feature vector to obtain the identity authentication result or performing first discrimination, by the primary discriminator, on the primary attribute feature vector to provide a combined attribute feature vector.

2. The method according to claim 1, wherein the extracting the primary attribute feature vector in the raw feature comprises:
   performing feature extraction on the raw feature, by an identity authentication model having a first generative adversarial network, to obtain the primary attribute feature vector in the raw feature.

3. The method according to claim 2, further comprising training the first generative adversarial network by a step comprising:
   when a first domain discrepancy feature and a second domain discrepancy feature having a causal relationship exist in the raw feature, ignoring decoupling learning with the first domain discrepancy feature during adversarial learning for the second domain discrepancy feature.

4. The method according to claim 2, wherein the first generative adversarial network comprises m generators $G_1$ to $G_m$, respectively corresponding to discriminators $D_{11}$ to $D_{mm}$;
   each generator $G_j$ corresponds to m discriminators $D_{j1}$ to $D_{jm}$;
   the generator $G_j$ is configured to learn a feature of a $j^{th}$ attribute, the attribute comprising an identity and m−1 domains;
   a generator $G_1$ corresponding to the identity is the primary generator, and a discriminator $D_{11}$ corresponding to the generator $G_1$ is the primary discriminator, wherein i, j, j'∈{1, 2, ..., m};
   wherein the method further comprising training the first generative adversarial network by steps comprising:
   fixing all generators $G_1$ to $G_m$, and optimizing all discriminators $D_{ij}$ to make an output of the first generative adversarial network approximate to a tag $y_i$ corresponding to an $i^{th}$ attribute;
   fixing all discriminators $D_{ij}$ and optimizing all generators $G_1$ to $G_m$ to make an output of the first generative adversarial network approximate to a tag $(1-y_i)$ corresponding to the $i^{th}$ attribute; and
   alternately performing the two fixing operations above until a training end condition for generators $G_i$ and the discriminators $D_{ij}$ is satisfied,
   wherein when a $j'^{th}$ attribute and the $j^{th}$ attribute have a causal relationship, back-propagation of an output loss of discriminator $D_{jj'}$ is skipped, wherein i, j, j'∈{1, 2, ..., m}.

5. The method according to claim 4, wherein the discriminators $D_{11}$ to $D_{mm}$ are divided into two categories: for all i, j∈{1, 2, ..., m}, i≠j;
   each discriminator $D_{ii}$ is configured to learn a feature of the $i^{th}$ attribute, and each discriminator $D_{ij}$ is configured to eliminate the feature of the $j^{th}$ attribute; and
   learning of each discriminator $D_{ii}$ includes standard supervised learning, and learning of each discriminator $D_{ij}$ includes adversarial learning.

6. The method according to claim 1, wherein the extracting the primary attribute feature vector in the raw feature comprises:
   performing feature extraction on the raw feature by an identity authentication model having a first generative adversarial network and a second generative adversarial network, the first generative adversarial network being trained by selectively decoupling the m−1 domain discrepancy features based on a causal relationship, and the second generative adversarial network being trained by performing additive adversarial training on at least one random combination of attribute feature vectors of different attributes extracted by the first generative adversarial network, the attributes comprising an identity and m−1 domain discrepancies.

7. The method according to claim 6, wherein the second generative adversarial network comprises a primary additive spatial transformer network and a primary recognition network;
the performing unbiased identity authentication based on the primary attribute feature vector to obtain the identity authentication result comprises:
converting, by the primary additive spatial transformer network, the combined attribute feature vector outputted by the first generative adversarial network to obtain an additive feature vector; and
performing identity recognition, by the primary recognition network, on the additive feature vector to obtain the identity authentication result.

8. The method according to claim 6, further comprising training the second generative adversarial network by steps comprising:
randomly combining the attribute feature vectors extracted by the first generative adversarial network from a training set to obtain the combined attribute feature vector; and
performing additive adversarial training on the combined attribute feature vector,
wherein at least one attribute combination corresponding to the combined attribute feature vector is an attribute combination that does not appear in the training set.

9. The method according to claim 6, wherein the second generative adversarial network comprises m additive spatial transformer networks and m recognition networks having one-to-one correspondence to m attributes, $j \in \{1, 2, \ldots, m\}$;
the method further comprises training the second generative adversarial network by the steps comprising:
randomly combining the attribute feature vectors corresponding to different attributes generated by the first generative adversarial network to generate $n_r$ combined attribute feature vectors;
dividing the $n_r$ combined attribute feature vectors into a first vector set and a second vector set, an attribute combination of the combined attribute feature vectors in the first vector set being an attribute combination appearing in a training set, and an attribute combination of the combined attribute feature vectors in the second vector set being an attribute combination that does not appear in the training set;
using the first vector set and the second vector set to predict the additive spatial transformer networks and the recognition networks, a $j^{th}$ additive spatial transformer network being configured to convert a $j^{th}$ combined attribute feature vector into a $j^{th}$ additive feature vector, and a $j^{th}$ recognition network being configured to perform tag recognition corresponding to the $j^{th}$ attribute on a sum feature vector of m additive feature vectors;
for a first loss of the first vector set generated when predicting the additive spatial transformer networks and the recognition networks, back-propagating the first loss to the recognition network and the additive spatial transformer network corresponding to each attribute; and
for a second loss of the second vector set generated when predicting the additive spatial transformer networks and the recognition networks, back-propagating the second loss to the recognition networks and the additive spatial transformer networks corresponding to other attributes.

10. A non-transitory computer-readable storage medium storing computer-readable instructions, the computer-readable instructions, when executed by one or more processors, causing the one or more processors to perform the method of claim 1.

11. The non-transitory computer-readable storage medium according to claim 10, wherein the computer-readable instructions, when executed by the one or more processors, cause the one or more processors to extract the primary attribute feature vector in the raw feature by performing feature extraction on the raw feature, by an identity authentication model having a first generative adversarial network, to obtain the primary attribute feature vector in the raw feature.

12. The non-transitory computer-readable storage medium according to claim 11, wherein the computer-readable instructions, when executed by the one or more processors, further cause the one or more processors to train the first generative adversarial network by when a first domain discrepancy feature and a second domain discrepancy feature having a causal relationship exist in the raw feature, ignoring decoupling learning with the first domain discrepancy feature during adversarial learning for the second domain discrepancy feature.

13. The non-transitory computer-readable storage medium according to The non-transitory computer-readable storage medium according to wherein the computer-readable instructions, when executed by the one or more processors, cause the one or more processors to extract the primary attribute feature vector in the raw feature by performing feature extraction on the raw feature by an identity authentication model having a first generative adversarial network and a second generative adversarial network, the first generative adversarial network being trained by selectively decoupling the m−1 domain discrepancy features based on a causal relationship, and the second generative adversarial network being trained by performing additive adversarial training on at least one random combination of attribute feature vectors of different attributes extracted by the first generative adversarial network, the attributes comprising an identity and m−1 domain discrepancies.

14. The non-transitory computer-readable storage medium according to claim 13, wherein the computer-readable instructions, when executed by the one or more processors, further cause the one or more processors to perform the unbiased identity authentication based on the primary attribute feature vector to obtain the identity authentication result by:
converting, by a primary additive spatial transformer network, the combined attribute feature vector outputted by the first generative adversarial network to obtain an additive feature vector; and
performing identity recognition, by a primary recognition network, on the additive feature vector to obtain the identity authentication result.

15. An identity authentication apparatus, comprising:
a sensor, configured to acquire a raw feature of a user, the raw feature containing m−1 domain discrepancy features, and m being an integer greater than 2;
and at least one processor in communication with the sensor, configured to:

extract a primary attribute feature vector in the raw feature by:
transforming, by a first generator, the raw feature into a global attribute feature vector; and
performing feature extraction, by a primary generator, on the global attribute feature vector to obtain the primary attribute feature vector, the primary attribute feature vector being an unbiased feature representation for selectively decoupling the m−1 domain discrepancy features in the raw feature; and
perform unbiased identity authentication based on the primary attribute feature vector to obtain an identity authentication result by a step comprising performing the identity authentication, by a primary discriminator, on the primary attribute feature vector to obtain the identity authentication result or performing first discrimination, by the primary discriminator, on the primary attribute feature vector to provide a combined attribute feature vector.

16. The apparatus according to claim 15, wherein the at least one processor comprises a first generative adversarial network configured to process the raw feature, wherein the at least one processor is further configured to:
train the first generative adversarial network by selectively decoupling the m−1 domain discrepancy features based on a causal relationship.

17. The apparatus according to claim 15, wherein
the at least one processor comprises a first generative adversarial network in communication with the sensor and configured to process the raw feature;
the first generative adversarial network comprises m generators $G_1$ to $G_m$, respectively corresponding to discriminators $D_{11}$ to $D_{mm}$;
each generator $G_j$ corresponds to m discriminators $D_{j1}$ to $D_{jm}$;
the generator $G_j$ is configured to learn a feature of a $j^{th}$ attribute, the attribute comprising an identity and m−1 domains;
a generator $G_1$ corresponding to the identity is the primary generator, and a discriminator $D_{11}$ corresponding to the generator $G_1$ is the primary discriminator, wherein i, j, j'∈{1, 2, . . . , m};
the at least one processor is further configured to train the first generative adversarial network by steps comprising:
fixing all generators $G_1$ to $G_m$, and optimizing all discriminators $D_{ij}$ to make an output of the first generative adversarial network approximate to a tag $y_i$ corresponding to an $i^{th}$ attribute;
fixing all discriminators $D_{ij}$, and optimizing all generators $G_i$ to make an output of the first generative adversarial network approximate to a tag $(1-y_i)$ corresponding to the $i^{th}$ attribute; and
alternately performing the two fixing operations above until a training end condition for the generators $G_1$ to $G_m$ and the discriminators $D_{ij}$ is satisfied; wherein
in response to a causal relationship between a j'$^{th}$ attribute and the $j^{th}$ attribute, back-propagation of an output loss of discriminator $D_{jj'}$ is skipped, wherein i, j, j'∈{1, 2, . . . , m}.

18. The apparatus according to claim 15, wherein
the at least one processor comprises a first generative adversarial network in communication with the sensor and a second generative adversarial network configured to process the raw feature;
the second generative adversarial network comprises a primary additive spatial transformer network in communication with the first generative adversarial network and a primary recognition network in communication with the primary additive spatial transformer network;
the primary additive spatial transformer network is configured to convert the combined attribute feature vector outputted by the first generative adversarial network to obtain an additive feature vector; and
the primary recognition network is configured to perform identity recognition on the additive feature vector to obtain the identity authentication result.

19. The apparatus according to claim 15, wherein
the at least one processor comprises a first generative adversarial network in communication with the sensor and a second generative adversarial network configured to process the raw feature;
the second generative adversarial network comprises m additive spatial transformer networks and m recognition networks having one-to-one correspondence to m attributes, j∈{1, 2, . . . , m};
the at least one processor is further configured to train the second generative adversarial network by steps comprising:
randomly combining attribute feature vectors corresponding to different attributes generated by the first generative adversarial network to generate $n_r$ combined attribute feature vectors;
dividing the $n_r$ combined attribute feature vectors into a first vector set and a second vector set, an attribute combination of the combined attribute feature vectors in the first vector set being an attribute combination appearing in a training set, and an attribute combination of the combined attribute feature vectors in the second vector set being an attribute combination that does not appear in the training set;
using the first vector set and the second vector set to predict the additive spatial transformer networks and the recognition networks, a $j^{th}$ additive spatial transformer network being configured to convert a $j^{th}$ combined attribute feature vector into a $j^{th}$ additive feature vector, and a $j^{th}$ recognition network being configured to perform tag recognition corresponding to the $j^{th}$ attribute on a sum feature vector of m additive feature vectors;
for a first loss of the first vector set generated when predicting the additive spatial transformer networks and the recognition networks, back-propagating the first loss to the recognition network and the additive spatial transformer network corresponding to each attribute;
and for a second loss of the second vector set generated when predicting the additive spatial transformer networks and the recognition networks, back-propagating the second loss to the recognition networks and the additive spatial transformer networks corresponding to other attributes.

20. A computer device, comprising at least one processor and a memory, the memory storing computer-readable instructions, the computer-readable instructions, when executed by the at least one processor, causing the at least one processor to:
acquire a raw feature of a user, the raw feature containing m−1 domain discrepancy features, and m being an integer greater than 2;
extract a primary attribute feature vector in the raw feature by:

transforming, by a first generator, the raw feature into a global attribute feature vector; and performing feature extraction, by a second generator, on the global attribute feature vector to obtain the primary attribute feature vector, the primary attribute feature vector being an unbiased feature representation by selectively decoupling the m−1 domain discrepancy features in the raw feature; and perform unbiased identity authentication based on the primary attribute feature vector to obtain an identity authentication result by a step comprising performing the identity authentication, by a primary discriminator, on the primary attribute feature vector to obtain the identity authentication result or performing first discrimination, by the primary discriminator, on the primary attribute feature vector to provide a combined attribute feature vector.

* * * * *

UNITED STATES PATENT AND TRADEMARK OFFICE
CERTIFICATE OF CORRECTION

| | | |
|---|---|---|
| PATENT NO. | : 12,019,718 B2 | Page 1 of 1 |
| APPLICATION NO. | : 17/359125 | |
| DATED | : June 25, 2024 | |
| INVENTOR(S) | : Jian Liang | |

It is certified that error appears in the above-identified patent and that said Letters Patent is hereby corrected as shown below:

In the Claims

Column 26, Claim 13, Lines 31-32, delete the first instance of "The non-transitory computer-readable storage medium according to"

Signed and Sealed this
Eighth Day of October, 2024

Katherine Kelly Vidal
*Director of the United States Patent and Trademark Office*